US012689947B2

(12) United States Patent
Babbellapati et al.

(10) Patent No.: US 12,689,947 B2
(45) Date of Patent: Jul. 21, 2026

(54) TECHNIQUES FOR DATA TRANSFER USING BANDWIDTH PARTS FOR WIRELESS ACCESS

(71) Applicant: QUALCOMM INCORPORATED, San Diego, CA (US)

(72) Inventors: Syam Krishna Babbellapati, Chennai (IN); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 18/546,577

(22) PCT Filed: Mar. 15, 2022

(86) PCT No.: PCT/US2022/020368
    § 371 (c)(1),
    (2) Date: Aug. 15, 2023

(87) PCT Pub. No.: WO2022/216417
    PCT Pub. Date: Oct. 13, 2022

(65) Prior Publication Data
    US 2024/0137814 A1    Apr. 25, 2024
    US 2024/0236771 A9    Jul. 11, 2024

(30) Foreign Application Priority Data

Apr. 7, 2021    (IN) .............................. 202141016314

(51) Int. Cl.
    *H04W 28/20*    (2009.01)
    *H04W 28/02*    (2009.01)
    (Continued)

(52) U.S. Cl.
    CPC ....... *H04W 28/20* (2013.01); *H04W 28/0284* (2013.01); *H04W 72/12* (2013.01); *H04W 84/12* (2013.01)

(58) Field of Classification Search
    CPC . H04W 28/20; H04W 28/0284; H04W 72/12; H04W 82/12
    See application file for complete search history.

(56) References Cited

U.S. PATENT DOCUMENTS

| | | | |
|---|---|---|---|
| 10,897,399 B2 * | 1/2021 | Jin | H04L 5/0098 |
| 2019/0132110 A1 * | 5/2019 | Zhou | H04L 5/0098 |

(Continued)

FOREIGN PATENT DOCUMENTS

| | | |
|---|---|---|
| CN | 107948097 A | 4/2018 |

OTHER PUBLICATIONS

International Search Report and Written Opinion—PCT/US2022/020368—ISA/EPO—Jun. 14, 2022 (2101034WO).

*Primary Examiner* — Melanie Jagannathan
(74) *Attorney, Agent, or Firm* — Holland & Hart LLP

(57)    ABSTRACT

Methods, systems, and devices for wireless communication are described. A communication device, such as a customer premises equipment (CPE) may include or otherwise be in communication with a cellular modem and a wireless local area network (WLAN) access point (AP). The CPE may receive a first indication of a bandwidth part (BWP) configuration identifying an active BWP for the wireless communication. The CPE may send a second indication to switch to the active BWP for the wireless communication based on the BWP configuration. The CPE may communicate with stations (STAs) served by the CPE based on the active BWP. Additionally or alternatively, when the CPE detects a need for additional bandwidth, the CPE can request for additional bandwidth parts (e.g., BWPs).

26 Claims, 18 Drawing Sheets

(51)  Int. Cl.
　　　*H04W 72/12*　　　(2023.01)
　　　*H04W 84/12*　　　(2009.01)

(56)　　　　　　　References Cited

U.S. PATENT DOCUMENTS

| | | | | |
|---|---|---|---|---|
| 2019/0222290 | A1* | 7/2019 | Ly | H04L 5/0098 |
| 2019/0281598 | A1 | 9/2019 | Almalfouh et al. | |
| 2019/0394776 | A1 | 12/2019 | Lee et al. | |
| 2020/0229100 | A1* | 7/2020 | He | H04W 80/02 |
| 2020/0245304 | A1* | 7/2020 | Nam | H04L 5/0078 |
| 2020/0314913 | A1* | 10/2020 | Rastegardoost | H04W 56/0045 |
| 2020/0344030 | A1* | 10/2020 | Cheng | H04L 5/0092 |
| 2021/0075579 | A1* | 3/2021 | Liu | H04L 5/0098 |
| 2021/0143967 | A1* | 5/2021 | Awad | H04L 5/0098 |
| 2021/0274377 | A1* | 9/2021 | Lee | H04W 72/0453 |
| 2021/0336755 | A1* | 10/2021 | Xiao | H04W 36/165 |
| 2022/0078873 | A1* | 3/2022 | Belleschi | H04W 28/24 |
| 2023/0050699 | A1* | 2/2023 | Wang | H04W 36/06 |
| 2023/0247615 | A1* | 8/2023 | Raghavan | H04W 72/0457 |
| | | | | 370/329 |
| 2024/0008015 | A1* | 1/2024 | Awad | H04W 72/30 |
| 2024/0147288 | A1* | 5/2024 | Huang | H04B 17/24 |
| 2025/0063438 | A1* | 2/2025 | Rastegardoost | H04W 36/08 |

\* cited by examiner

Default BWP
230

Active BWP
220

Additional
Active BWP
225

BWP
Configuration

210

WLAN
AP

Cellular
Modem 170-a 165-a

205

205

205

115-a 115-b 160-a 105-a

BWP Switch
Indication

Receiving a first indication of a BWP configuration identifying an active BWP for wireless communication

1505

Sending a second indication to switch to the active BWP for the wireless communication based at least in part on the BWP configuration

1510

Communicating with one or more STAs served by the device in accordance with the active BWP

1515

1500

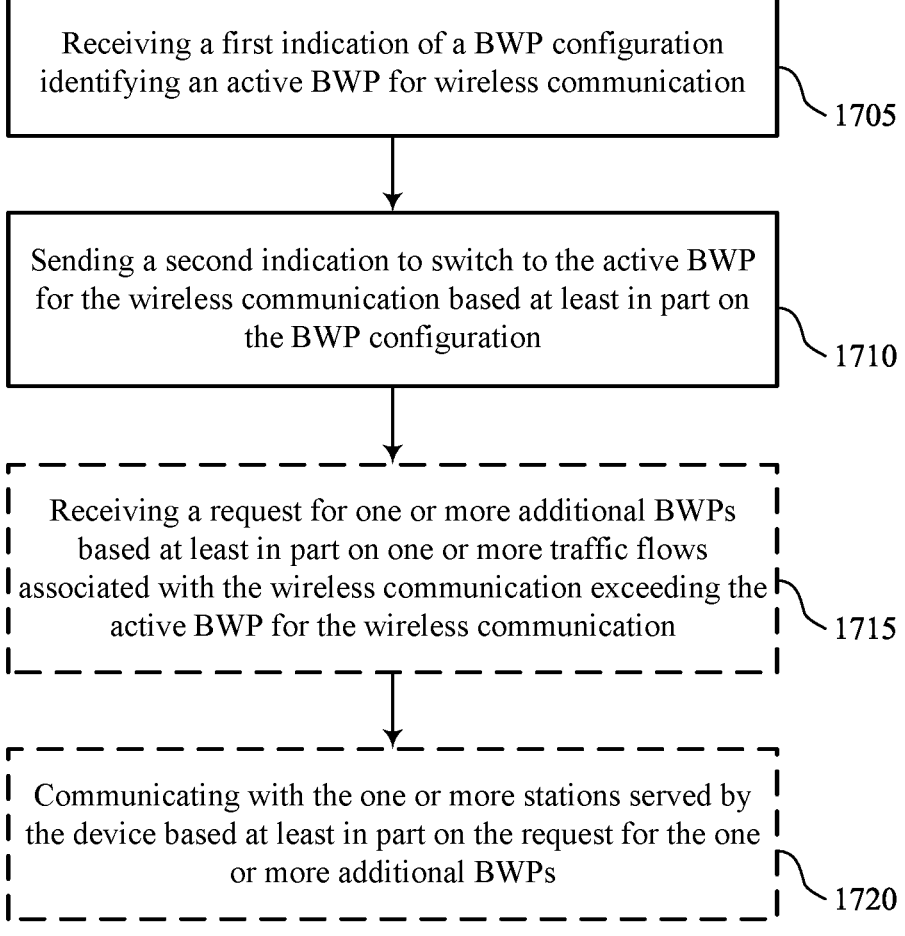

Receiving a first indication of a BWP configuration identifying an active BWP for wireless communication

1705

Sending a second indication to switch to the active BWP for the wireless communication based at least in part on the BWP configuration

1710

Receiving a request for one or more additional BWPs based at least in part on one or more traffic flows associated with the wireless communication exceeding the active BWP for the wireless communication

1715

Communicating with the one or more stations served by the device based at least in part on the request for the one or more additional BWPs

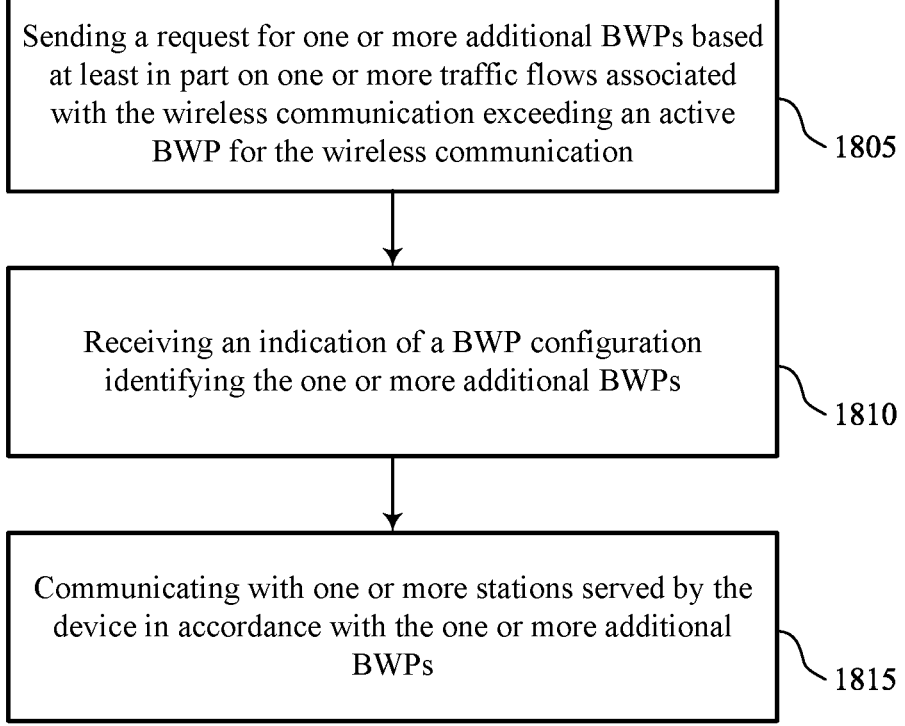

Sending a request for one or more additional BWPs based at least in part on one or more traffic flows associated with the wireless communication exceeding an active BWP for the wireless communication

1805

Receiving an indication of a BWP configuration identifying the one or more additional BWPs

1810

Communicating with one or more stations served by the device in accordance with the one or more additional BWPs

TECHNIQUES FOR DATA TRANSFER USING BANDWIDTH PARTS FOR WIRELESS ACCESS

CROSS REFERENCE

The present application is a 371 national stage filing of International PCT Application No. PCT/US2022/020368 by BABBELLAPATI et al. entitled "TECHNIQUES FOR DATA TRANSFER USING BANDWIDTH PARTS FOR WIRELESS ACCESS," filed Mar. 15, 2022; and claims priority to International Patent Application No. 202141016314 by BABBELLAPATI et al. entitled "TECHNIQUES FOR DATA TRANSFER USING BANDWIDTH PARTS FOR WIRELESS ACCESS," filed Apr. 7, 2021, each of which is assigned to the assignee hereof, and each of which is expressly incorporated by reference in its entirety herein.

INTRODUCTION

The following relates to wireless communication, including techniques for managing a bandwidth part (BWP) for the wireless communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include wireless local area networks (WLAN), fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, one or more access points (APs), or one or more network access nodes, each simultaneously supporting communication for multiple communication devices, which may be otherwise known as a user equipment (UE) or a stations (STA).

SUMMARY

A method for wireless communication at a device is described. The method may include receiving a first indication of a bandwidth part (BWP) configuration identifying an active BWP for the wireless communication, sending a second indication to switch to the active BWP for the wireless communication based on the BWP configuration, and communicating with one or more stations (STAs) served by the device in accordance with the active BWP.

An apparatus for wireless communication at a device is described. The apparatus may include a processor, and a memory coupled with the processor, with instructions stored in the memory, the instructions being executable by the processor to cause the apparatus to receive a first indication of a BWP configuration identifying an active BWP for the wireless communication, send a second indication to switch to the active BWP for the wireless communication based on the BWP configuration, and communicate with one or more STAs served by the device in accordance with the active BWP.

Another apparatus for wireless communication at a device is described. The apparatus may include means for receiving a first indication of a BWP configuration identifying an active BWP for the wireless communication, means for sending a second indication to switch to the active BWP for the wireless communication based on the BWP configuration, and means for communicating with one or more STAs served by the device in accordance with the active BWP.

A non-transitory computer-readable medium storing code for wireless communication at a device is described. The code may include instructions executable by a processor to receive a first indication of a BWP configuration identifying an active BWP for the wireless communication, send a second indication to switch to the active BWP for the wireless communication based on the BWP configuration, and communicate with one or more STAs served by the device in accordance with the active BWP.

Some examples of the method, apparatuses, and non-transitory computer-readable medium described herein may further include operations, features, means, or instructions for monitoring one or more wireless local area network events associated with the device. In some examples of the method, apparatuses, and non-transitory computer-readable medium described herein, communicating with the one or more STAs served by the device may be based on the monitoring of the one or more wireless local area network events associated with the device.

Some examples of the method, apparatuses, and non-transitory computer-readable medium described herein may further include operations, features, means, or instructions for receiving a third indication of a congestion at the device based on one or more traffic flows associated with the wireless communication over one or more occasions.

Some examples of the method, apparatuses, and non-transitory computer-readable medium described herein may further include operations, features, means, or instructions for resetting an inactivity timer based on the third indication of the congestion at the device over one or more subsequent occasions.

Some examples of the method, apparatuses, and non-transitory computer-readable medium described herein may further include operations, features, means, or instructions for receiving a request for one or more additional BWPs based on one or more traffic flows associated with the wireless communication exceeding the active BWP for the wireless communication. In some examples of the method, apparatuses, and non-transitory computer-readable medium described herein, communicating with the one or more STAs served by the device may be based on the request for the one or more additional BWPs.

Some examples of the method, apparatuses, and non-transitory computer-readable medium described herein may further include operations, features, means, or instructions for allocating the one or more additional BWPs for the one or more traffic flows associated with the wireless communication based on the request for the one or more additional BWPs. The active BWP including the one or more additional BWPs for the wireless communication. In some examples of the method, apparatuses, and non-transitory computer-readable medium described herein, communicating with the one or more STAs served by the device may be based on the allocating of the one or more additional BWPs.

Some examples of the method, apparatuses, and non-transitory computer-readable medium described herein may further include operations, features, means, or instructions for sending a third indication to switch to a default BWP for the wireless communication based on an inactivity timer expiring and where communicating with the one or more STAs served by the device may be based on the default BWP.

Some examples of the method, apparatuses, and non-transitory computer-readable medium described herein may further include operations, features, means, or instructions for resetting an inactivity timer based on an absence of receiving an additional request for the one or more additional BWPs during one or more occasions based on the one or more traffic flows associated with the wireless communication exceeding the active BWP for the wireless communication.

A method for wireless communication at a device is described. The method may include sending a request for one or more additional BWPs based on one or more traffic flows associated with the wireless communication exceeding an active BWP for the wireless communication, receiving an indication of a BWP configuration identifying the one or more additional BWPs, and communicating with one or more STAs served by the device in accordance with the one or more additional BWPs.

An apparatus for wireless communication at a device is described. The apparatus may include a processor, and a memory coupled with the processor, with instructions stored in the memory, the instructions being executable by the processor to cause the apparatus to send a request for one or more additional BWPs based on one or more traffic flows associated with the wireless communication exceeding an active BWP for the wireless communication, receive an indication of a BWP configuration identifying the one or more additional BWPs, and communicate with one or more STAs served by the device in accordance with the one or more additional BWPs.

Another apparatus for wireless communication at a device is described. The apparatus may include means for sending a request for one or more additional BWPs based on one or more traffic flows associated with the wireless communication exceeding an active BWP for the wireless communication, means for receiving an indication of a BWP configuration identifying the one or more additional BWPs, and means for communicating with one or more STAs served by the device in accordance with the one or more additional BWPs.

A non-transitory computer-readable medium storing code for wireless communication at a device is described. The code may include instructions executable by a processor to send a request for one or more additional BWPs based on one or more traffic flows associated with the wireless communication exceeding an active BWP for the wireless communication, receive an indication of a BWP configuration identifying the one or more additional BWPs, and communicate with one or more STAs served by the device in accordance with the one or more additional BWPs.

Some examples of the method, apparatuses, and non-transitory computer-readable medium described herein may further include operations, features, means, or instructions for monitoring the one or more traffic flows associated with the wireless communication. In some examples of the method, apparatuses, and non-transitory computer-readable medium described herein, communicating with the one or more STAs served by the device may be based on the monitoring of the one or more traffic flows associated with the wireless communication.

Some examples of the method, apparatuses, and non-transitory computer-readable medium described herein may further include operations, features, means, or instructions for receiving, from a PDN, the one or more traffic flows associated with the wireless communication and grouping the one or more traffic flows associated with the wireless communication.

Some examples of the method, apparatuses, and non-transitory computer-readable medium described herein may further include operations, features, means, or instructions for scheduling the one or more traffic flows associated with the wireless communication based on one or more of the active BWP for the wireless communication. In some examples of the method, apparatuses, and non-transitory computer-readable medium described herein, communicating with the one or more STAs served by the device may be based on the scheduling of the one or more traffic flows associated with the wireless communication.

Some examples of the method, apparatuses, and non-transitory computer-readable medium described herein may further include operations, features, means, or instructions for sending a second indication of a congestion at the device based on determining that a channel associated with the device may be unavailable for the one or more traffic flows associated with the wireless communication over one or more occasions.

In some examples of the method, apparatuses, and non-transitory computer-readable medium described herein, sending the request for the one or more additional BWPs is based at least in part on a buffer associated with the device satisfying a threshold over one or more occasions.

Some examples of the method, apparatuses, and non-transitory computer-readable medium described herein may further include operations, features, means, or instructions for receiving a second indication to switch to a default BWP for the wireless communication or a radio resource control (RRC) configuration to switch to the default BWP for the wireless communication. Some examples of the method, apparatuses, and non-transitory computer-readable medium described herein may further include operations, features, means, or instructions for determining an expiration of an inactivity timer associated with the device. Some examples of the method, apparatuses, and non-transitory computer-readable medium described herein may further include operations, features, means, or instructions for switching to the default BWP for the wireless communication based on the expiration of the inactivity timer. In some examples of the method, apparatuses, and non-transitory computer-readable medium described herein, communicating with the one or more STAs served by the device based on the default BWP.

BRIEF DESCRIPTION OF THE DRAWINGS

FIG. 4 illustrates an example of a BWP adaptation timeline that supports techniques for data transfer using BWPs for wireless access in accordance with one or more aspects of the present disclosure.

5

Figure 6:
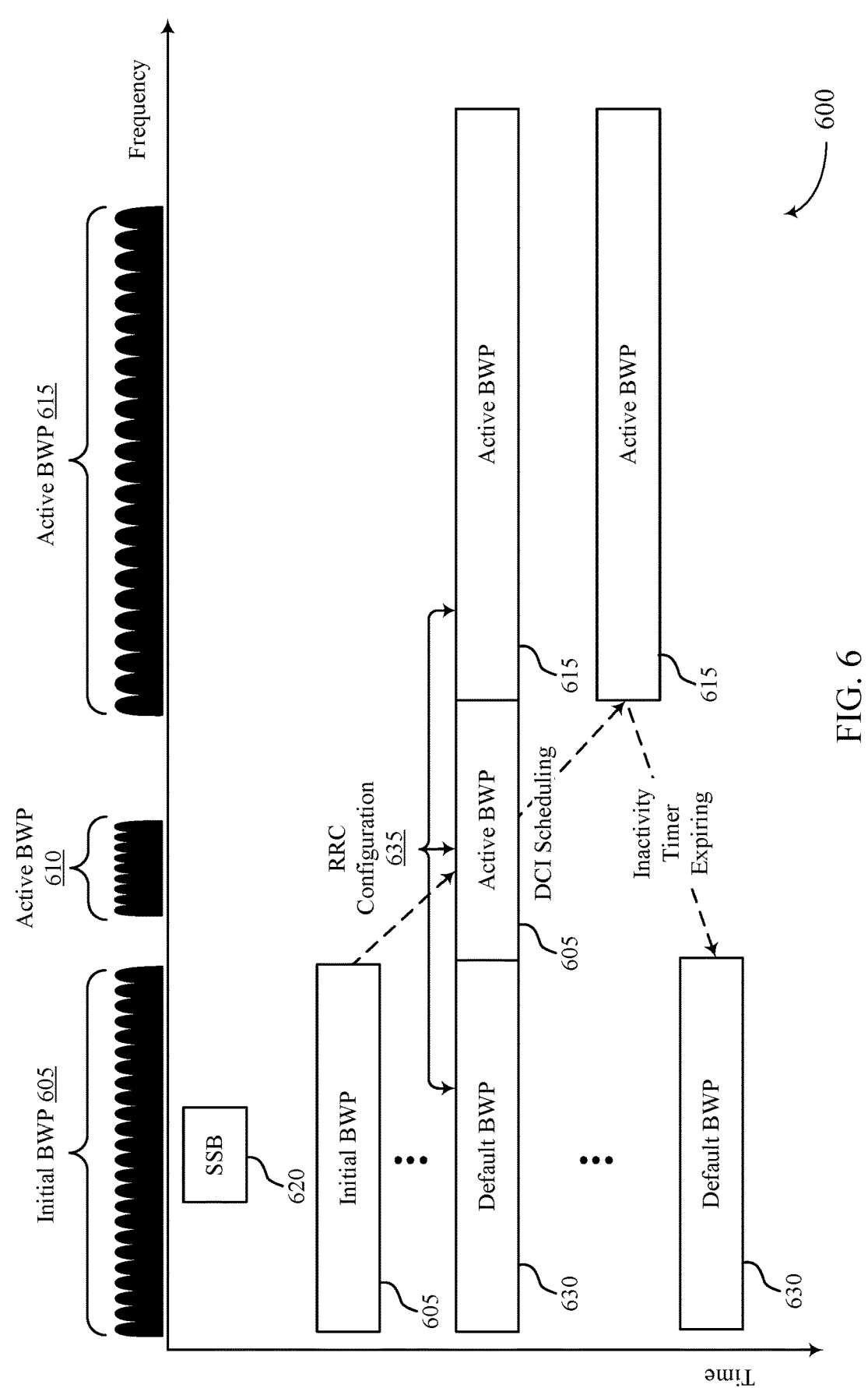

FIG. 6 illustrates an example of a BWP switching timeline that supports techniques for data transfer using BWPs for wireless access in accordance with one or more aspects of the present disclosure.

Figure 7:
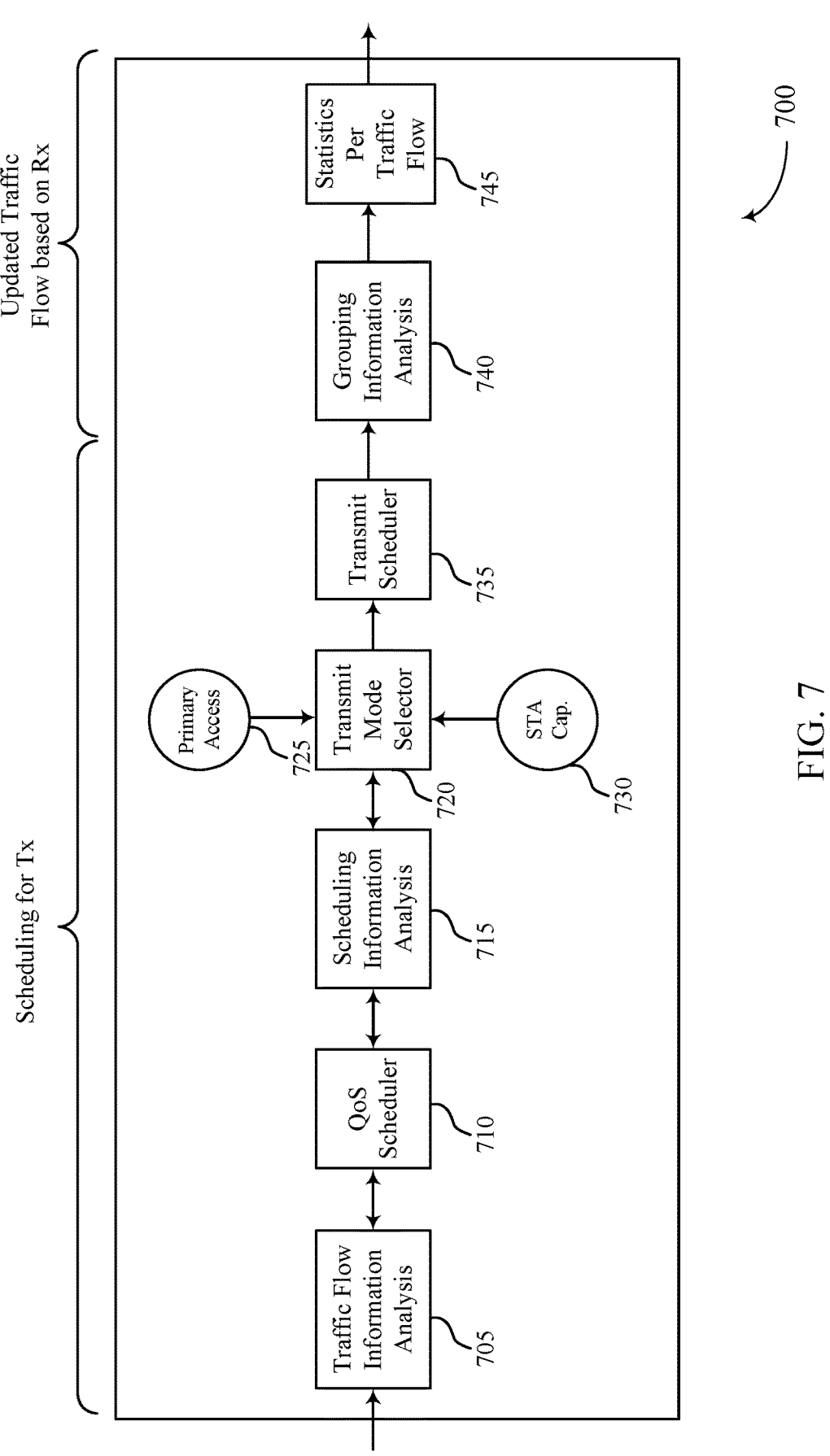
Figure 8:
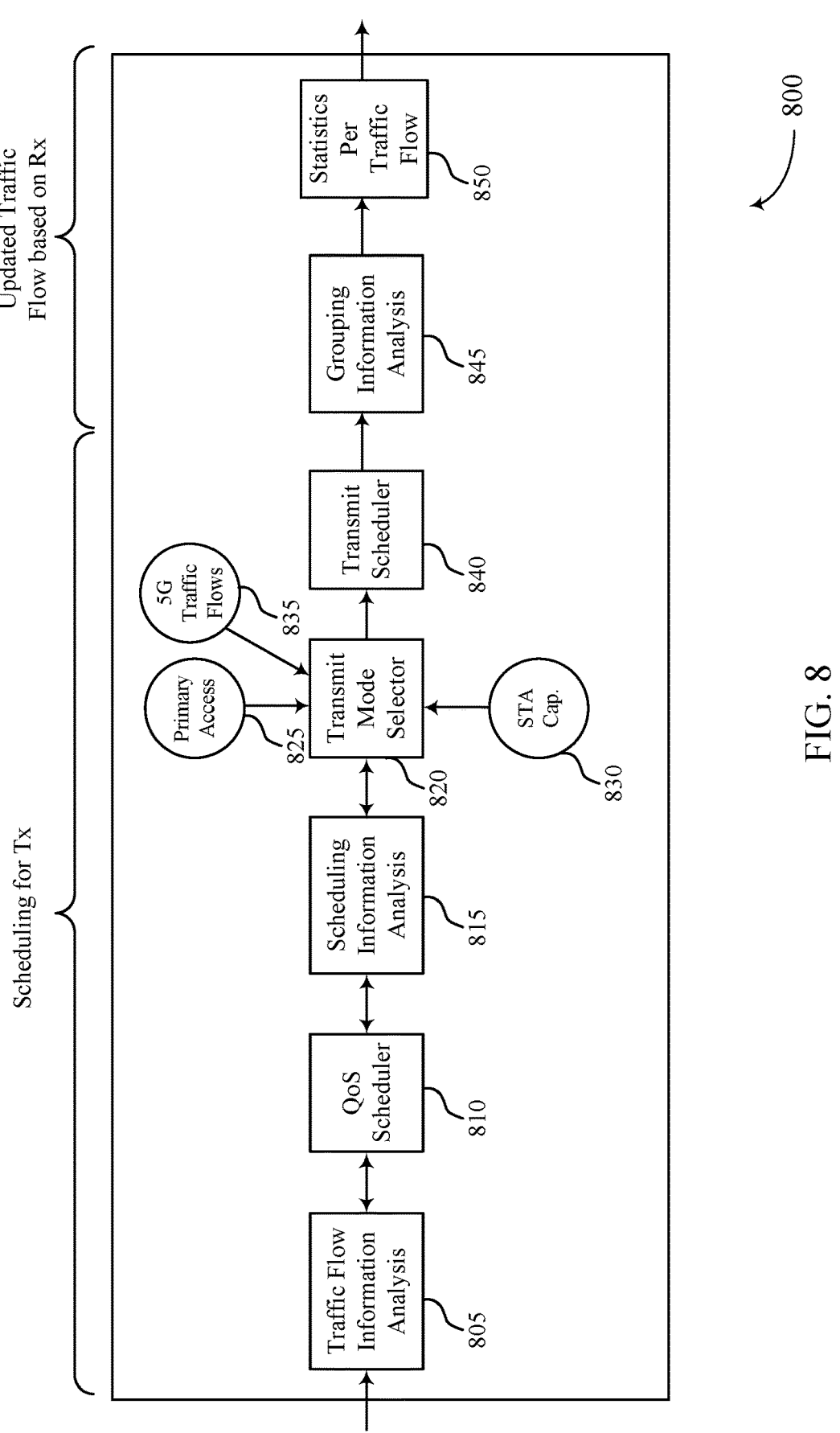

FIGS. 7 and 8 illustrate examples of scheduler pipelines that support techniques for data transfer using BWPs for wireless access in accordance with one or more aspects of the present disclosure.

Figure 9:
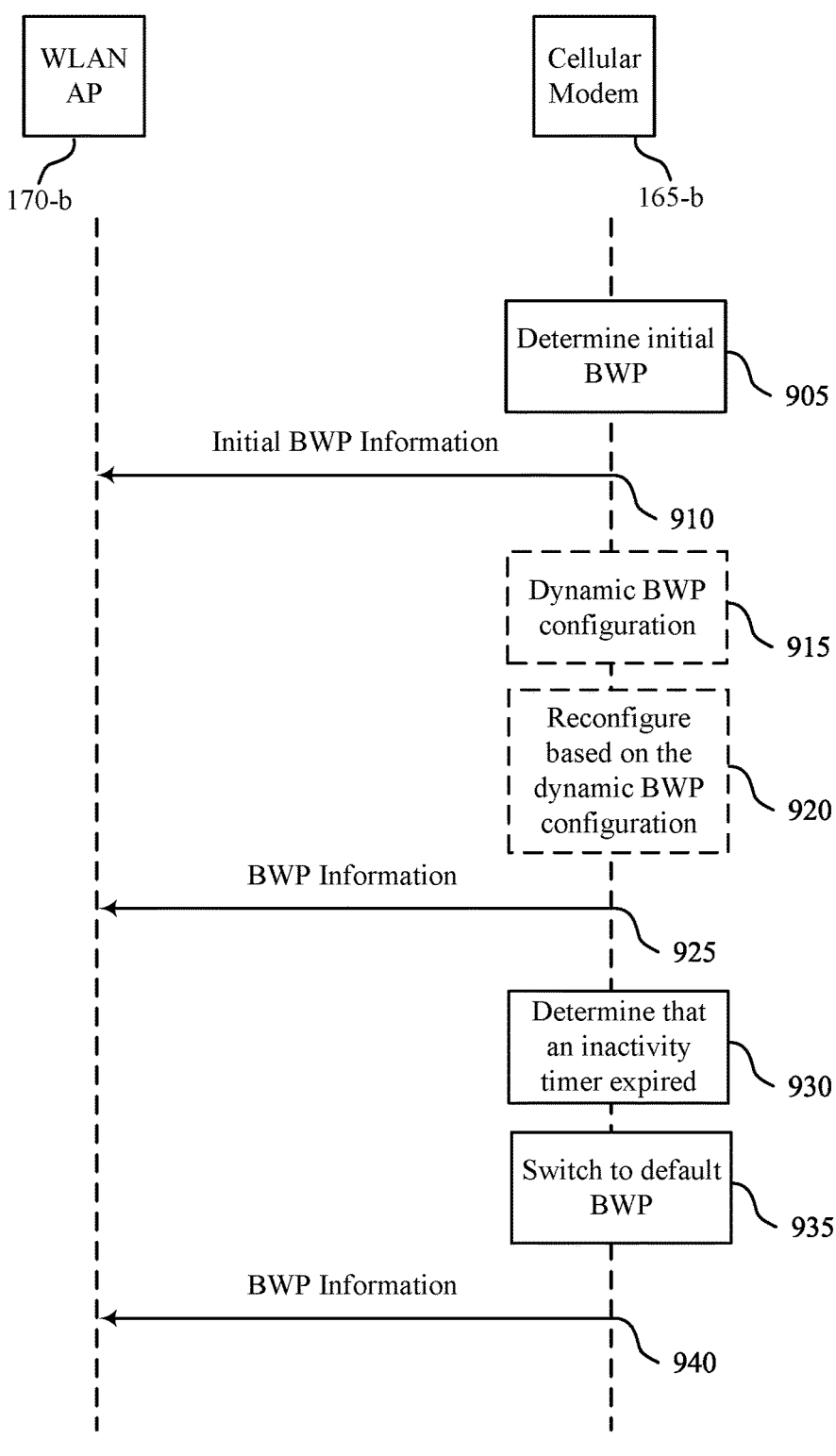
Figure 10:
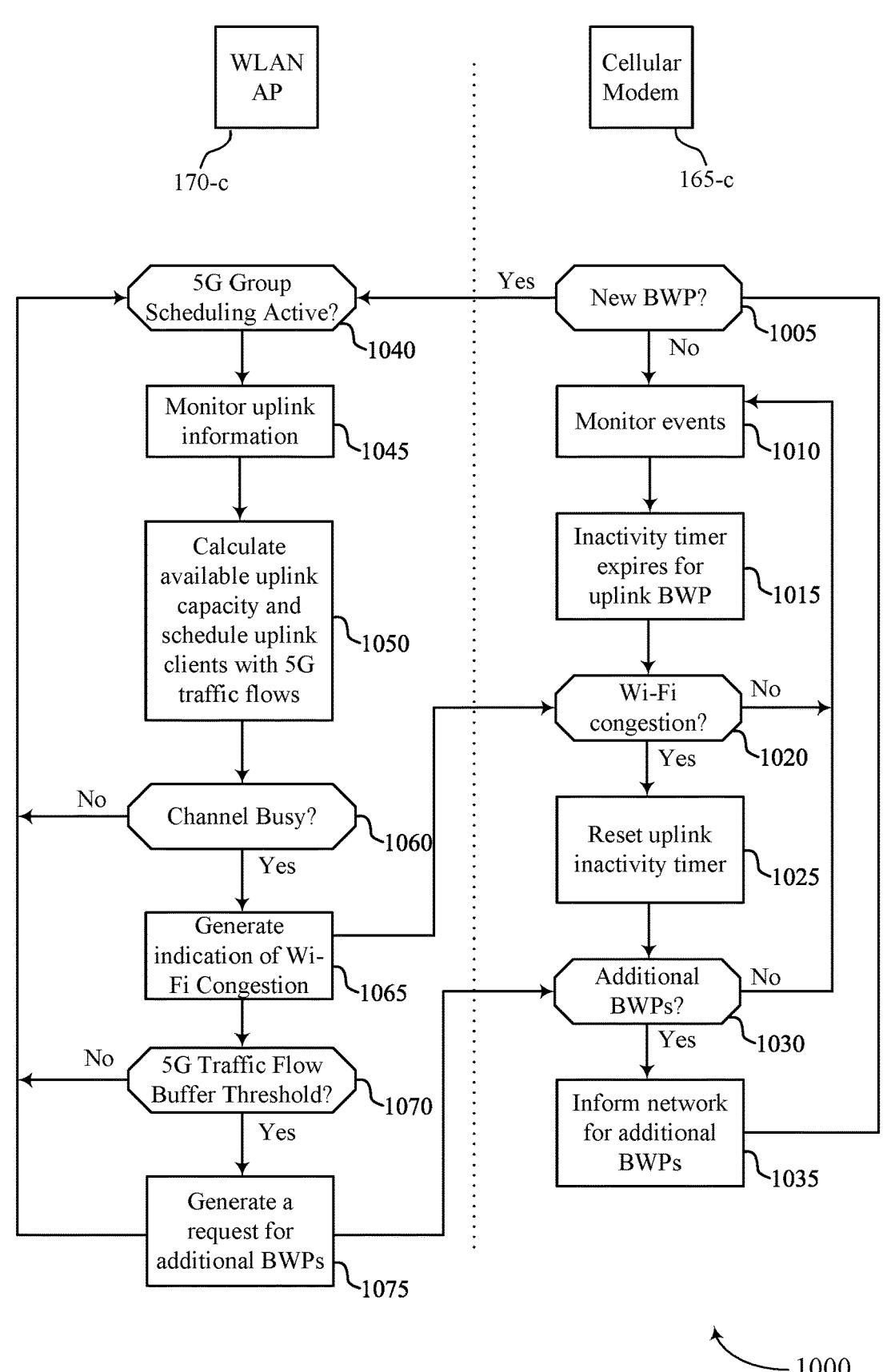

FIGS. 9 and 10 illustrate examples of process flows that support techniques for data transfer using BWPs for wireless access in accordance with one or more aspects of the present disclosure.

Figure 11:
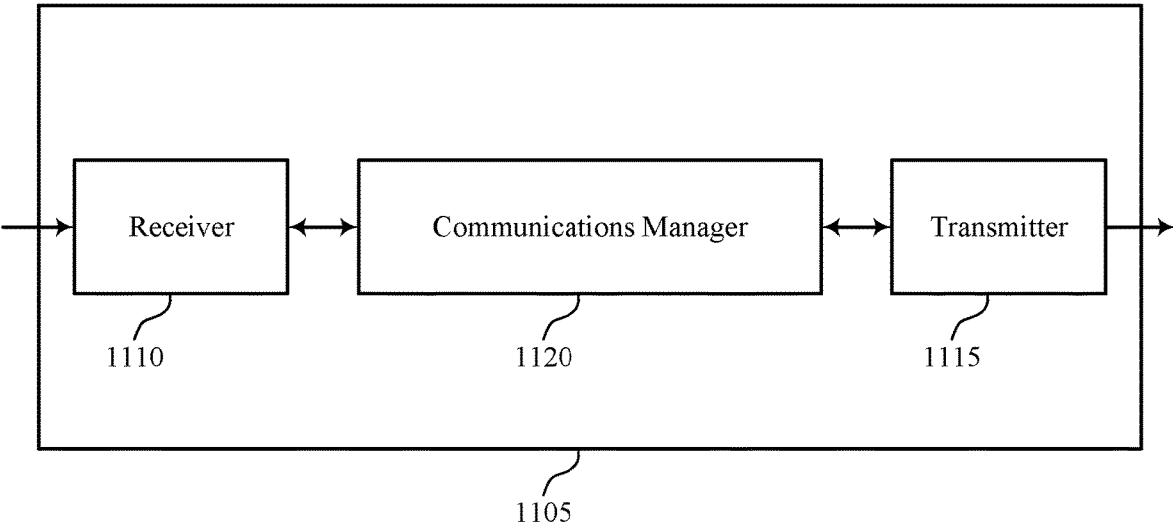
Figure 11:
Figure 12:
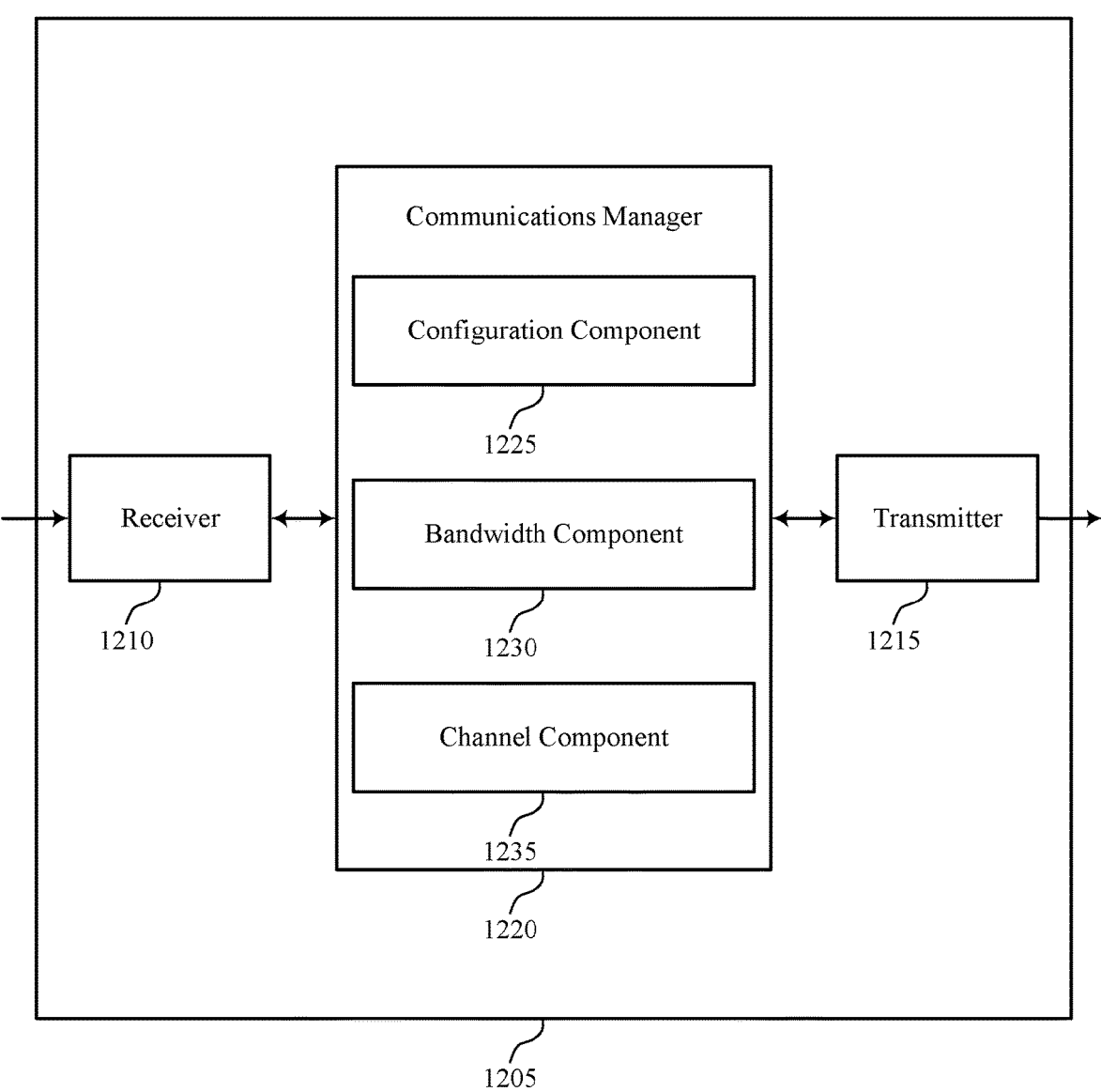

FIGS. 11 and 12 show block diagrams of devices that support techniques for data transfer using BWPs for wireless access in accordance with one or more aspects of the present disclosure.

Figure 13:
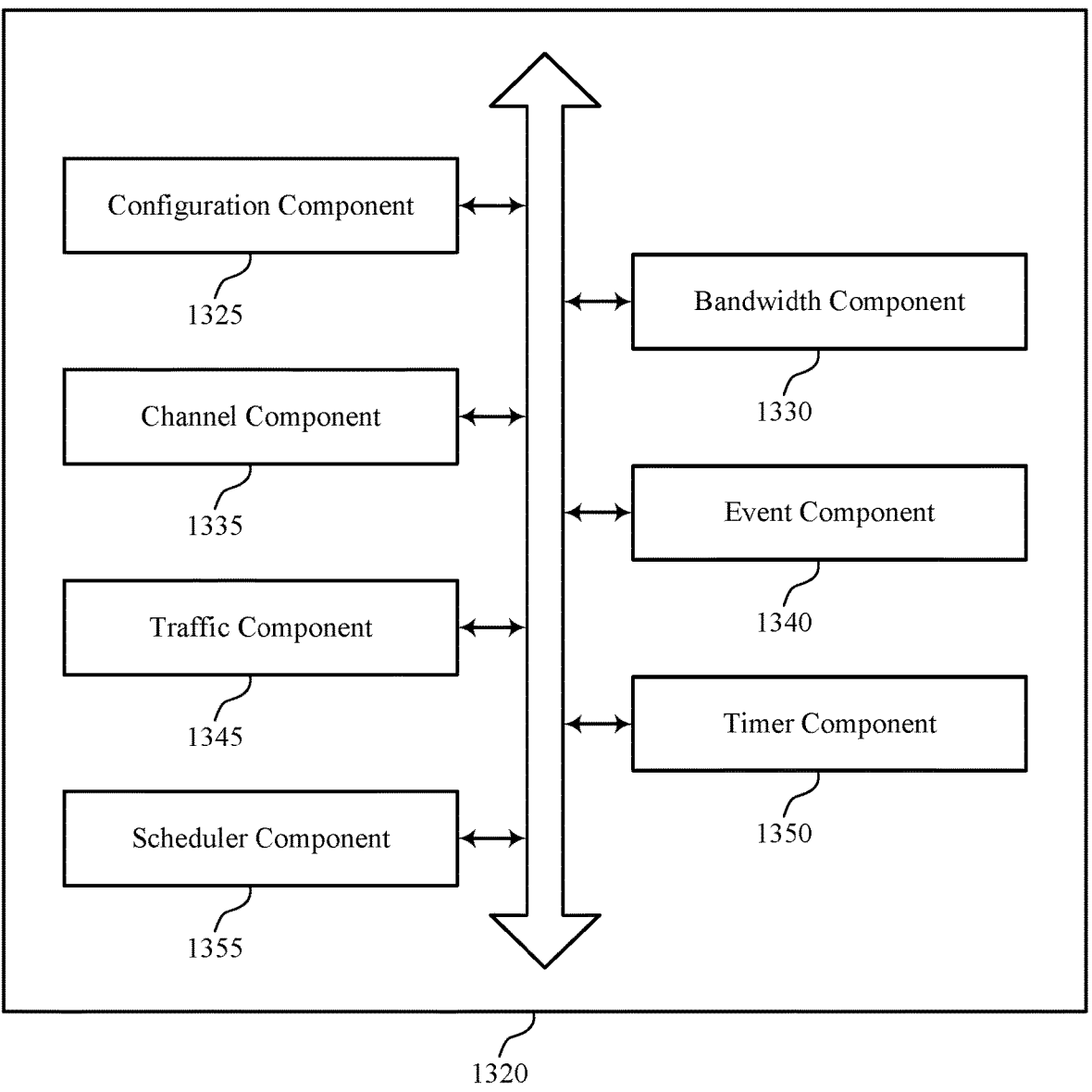

FIG. 13 shows a block diagram of a communications manager that supports techniques for data transfer using BWPs for wireless access in accordance with one or more aspects of the present disclosure.

Figure 14:
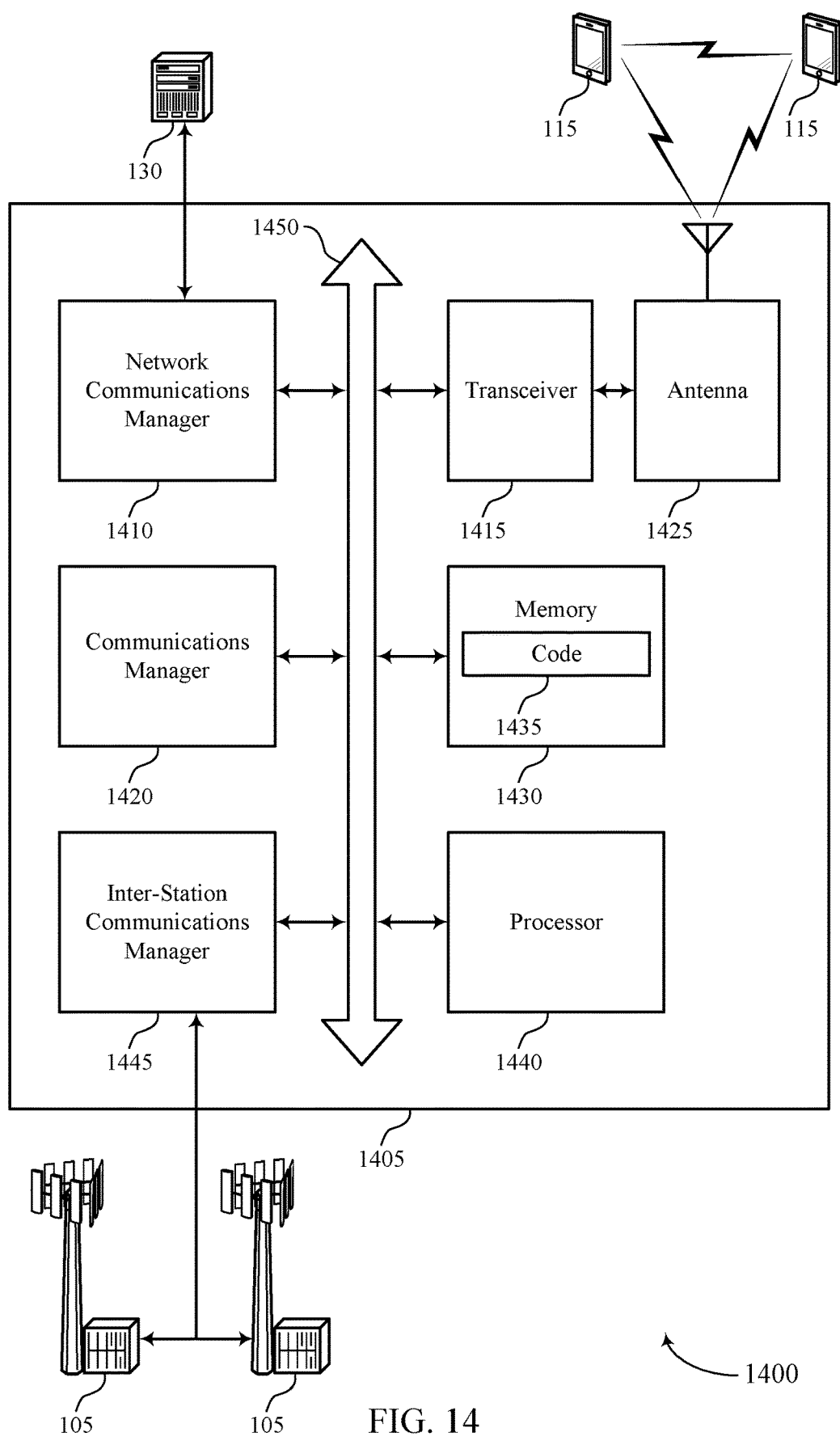

FIG. 14 shows a diagram of a system including a device that supports techniques for data transfer using BWPs for wireless access in accordance with one or more aspects of the present disclosure.

FIGS. 15 through 18 show flowcharts illustrating methods that support techniques for data transfer using BWPs for wireless access in accordance with one or more aspects of the present disclosure.

DETAILED DESCRIPTION

A wireless communications system may include various communication devices, such as a UE (also referred to as a STA) and a base station. The wireless communications system may also include an access device also referred to as a customer premise equipment (CPE), a fixed wireless access (FWA) device, or a next generation CPE (such as a fifth generation (5G) CPE or a sixth generation (6G) CPE, among other next generation radio access technologies). The CPE may include or otherwise be in communication with a cellular modem and a WLAN AP (also referred to as a Wi-Fi AP). The cellular modem may be configured to dynamically change a bandwidth using bandwidth parts (BWPs) when traffic flows change. For example, the cellular modem may be configured to allocate more or less bandwidth for when uplink traffic increases or decreases.

In some cases, the Wi-Fi AP may be unaware of the bandwidth management at the cellular modem. Various aspects of the present disclosure relate to providing cellular modem awareness for the Wi-Fi AP so that the cellular modem may dynamically change the bandwidth in accordance with the Wi-Fi AP. Various aspects of the present disclosure also relate to enabling one or more of a cellular modem of a CPE and a WLAN AP of the CPE to support techniques for data (e.g., uplink data, downlink data) transfer using BWPs. It should be understood that various aspects of the present disclosure related to techniques for data transfer using BWPs are applicable to 5G and 6G radio access technologies, as well as other next generation technologies.

The CPE may be enabled to exchange various information between the WLAN AP of the CPE and the cellular modem of the CPE, such that the cellular modem may dynamically adjust a bandwidth for the WLAN AP. For example, the WLAN AP may calculate an available uplink capacity and schedule uplink clients (e.g., STAs) with cellular traffic flows (e.g., 5G traffic flows). In some cases, when the WLAN AP determines that a Wi-Fi channel is busy for cellular traffic flows, the Wi-Fi AP can indicate a Wi-Fi channel congestion to the cellular modem. In some examples, the cellular modem can reset an uplink inactivity timer. In some cases, when the WLAN AP determines that a buffer is busy for cellular traffic flows, the WLAN AP can indicate a request for additional bandwidth from the cellular modem. In other words, the WLAN AP may determine that not enough buffers are available for cellular traffic flows. As such, the WLAN AP may request for additional bandwidth from the cellular modem, which may then inform the network for additional uplink BWPs.

The techniques employed by the CPE may affect the operation of the CPE, among other devices such as the base station and the UE. For example, operations performed by the CPE in accordance with the described techniques may reduce latency of wireless communications for the CPE, the UE, and the base station. By implementing the described techniques, the CPE may also experience higher data rates and higher throughput for wireless communications at the CPE, the UE, and the base station.

Aspects of the disclosure are initially described in the context of wireless communications systems. Aspects of the disclosure are further illustrated by and described herein with reference to apparatus diagrams, system diagrams, and flowcharts that relate to techniques for data (e.g., uplink data, downlink data) transfer using BWPs for wireless access.

Figure 1:
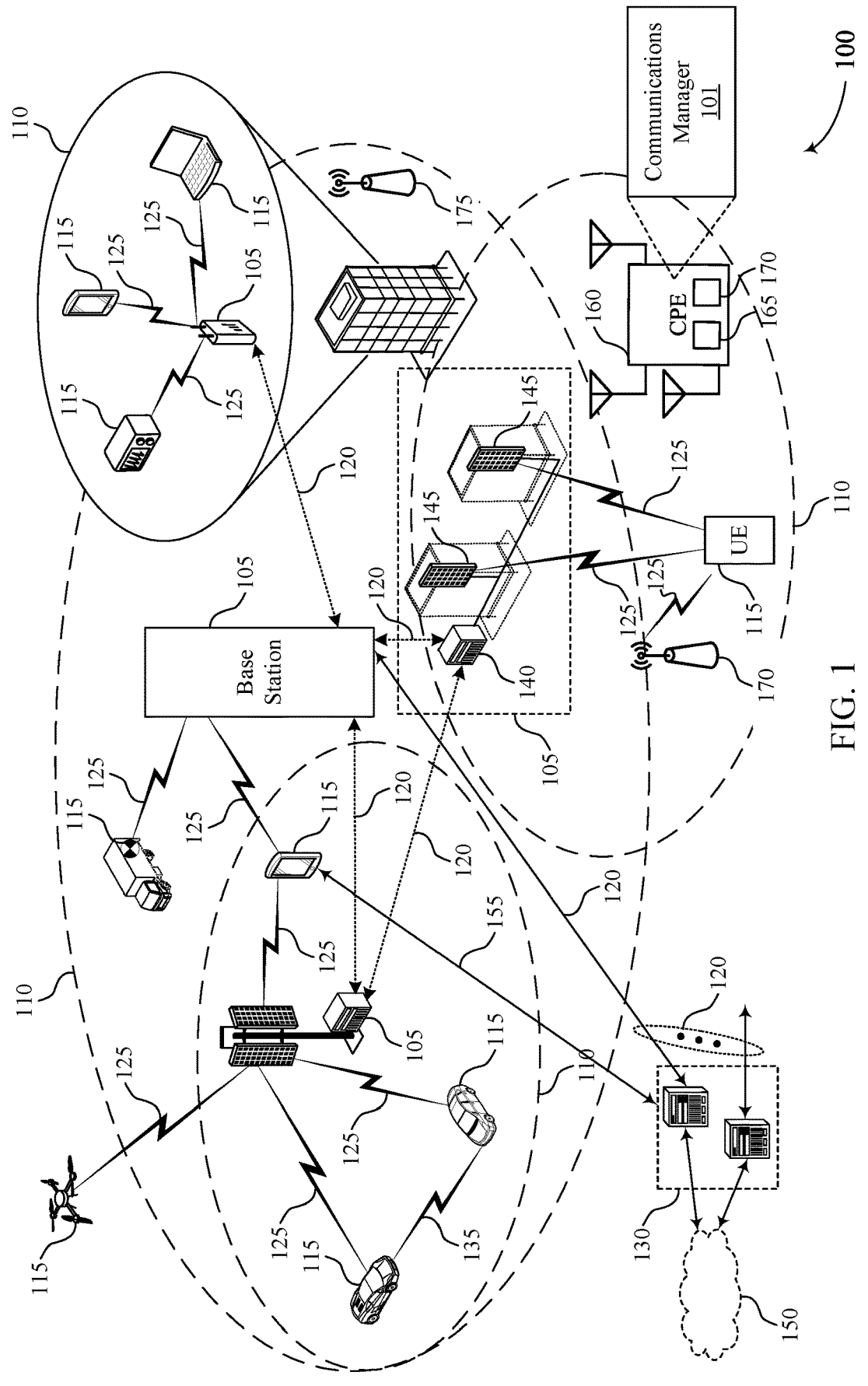
FIGS. 1 through 3 illustrate examples of wireless communications systems that support techniques for data transfer using BWPs for wireless access in accordance with one or more aspects of the present disclosure.

FIG. 1 illustrates an example of a wireless communications system 100 that supports techniques for data transfer using BWPs for wireless access in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a network device, a network node, a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology. A UE 115 may communicate with the core network 130 through a communication link 155.

A UE 115 may include or may be referred to as a mobile device, a wireless device, a STA, a remote device, a hand-held device, or a subscriber device, or some other suitable terminology, where the "device" may also be referred to as a unit, a station, a terminal, or a client (e.g., a Wi-Fi client), among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to any combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or any combination of these techniques. For example, some UEs 115 may be configured for operation using a narrowband protocol type that is associated with a defined portion or range (e.g., set of subcarriers or resource blocks) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "mmW" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 or FR2 into mid-band frequencies, or both. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base station 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use any combination of digital precoding or radio frequency beam-forming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feed-back (e.g., a multi-panel type codebook, a linear combina-tion type codebook, a port selection type codebook). Although these techniques are described herein with refer-ence to signals transmitted in one or more directions by a base station 105, a UE 115 may employ similar techniques for transmitting signals multiple times in different directions (e.g., for identifying a beam direction for subsequent trans-mission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to differ-ent receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configu-ration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communi-cate over logical channels. A Medium Access Control (MAC) layer may perform priority handling and multiplex-ing of logical channels into transport channels. The MAC layer may also use error detection techniques, error correc-tion techniques, or both to support retransmissions at the MAC layer to affect link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the like-lihood that data is received correctly over a communication link 125. HARQ may include any combination of error detection (e.g., using a cyclic redundancy check (CRC)), forward error correction (FEC), and retransmission (e.g., automatic repeat request (ARQ)). HARQ may affect throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may include a CPE 160 (also referred to as a 5G-CPE), which may include a 5G modem 165 (also referred to as a cellular modem) and a WLAN AP 170. The CPE 160 may be configured to provide 5G via wide area network (WAN) connections, as well as Wi-Fi and Ethernet via local-area network (LAN) connections. In some examples, the 5G modem 165 of the CPE 160 may be configured to dynamically adjust a band-width using one or more BWPs. In some cases, the WLAN AP 170 of the CPE 160 may provide Wi-Fi MAC and Wi-Fi channel efficiency. However, the WLAN AP 170 of the CPE 160 may lack the capabilities of the 5G modem 165 of the CPE 160, such as dynamic bandwidth awareness. In some other cases, the WLAN AP 170 of the CPE 160 may have low reliability due to overlapping basic service sets (OBSSs) from nearby WLAN APs 175 in the wireless communica-tions system 100. In other cases, the WLAN AP 170 of the CPE 160 may experience variable latency due to carrier-sense multiple access, in which the WLAN AP 170 verifies the absence of other traffic before transmitting in the wire-less communications system 100.

Although the 5G modem 165 of the CPE 160 is config-ured to dynamically change bandwidths based on applica-tion requirements, the lack of coordination between the WLAN AP 170 of the CPE 160 and the 5G modem 165 of the CPE 160 may result in poor user experience as well as sub-optimal power management at the CPE 160. In some cases, the lack of coordination between the WLAN AP 170 of the CPE 160 and the 5G modem 165 of the CPE 160 may result in wasted Wi-Fi airtime as packets are dropped by the 5G modem 165 due to lack of bandwidth. In some other cases, the lack of coordination between the WLAN AP 170 of the CPE 160 and the 5G modem 165 of the CPE 160 may result in an inability to convey Wi-Fi congestion to the 5G modem 165, which may result in unnecessary bandwidth breakdown. In other cases, the lack of coordination between the WLAN AP 170 of the CPE 160 and the 5G modem 165 of the CPE 160 may result in an inability of the 5G modem 165 to look ahead and request for additional bandwidth based on Wi-Fi clients (e.g., one or more UEs 115) buffer query (also referred to as qdepth).

Various aspects of the present disclosure relate to enabling one or more of the 5G modem 165 of the CPE 160 and the WLAN AP 170 of the CPE 160 to support techniques for data (e.g., uplink data, downlink data) transfer using BWPs. The CPE 160 may include a communications manager 101 that may support wireless communication at the CPE 160 (e.g., a 5G-CPE) in accordance with examples as disclosed herein. The communications manager 101 may be an example of aspects of a communications manager as described herein in FIGS. 11 through 14. For example, the communications manager 101 may enable exchange of various information between a Wi-Fi scheduler of the WLAN AP 170 of the CPE 160 and a 5G connection manager of the 5G modem 165 of the CPE 160, such that the 5G connection manager can dynamically adjust a bandwidth for the WLAN AP 170. For example, the Wi-Fi scheduler of the WLAN AP 170 may calculate an available uplink capacity and schedule uplink client with 5G traffic flows.

In some cases, when the Wi-Fi scheduler of the WLAN AP 170 determines that a Wi-Fi channel is busy for 5G traffic flows, the Wi-Fi scheduler can indicate a Wi-Fi channel congestion to the 5G connection manager of the 5G modem 165. Based on this indication, the 5G connection manager can reset an uplink inactivity timer. In some case, when Wi-Fi scheduler of the WLAN AP 170 determines that a buffer is busy for 5G traffic flows, the Wi-Fi scheduler can indicate a request for additional bandwidth from the 5G connection manager of the 5G modem 165. The 5G connection manager may then inform the network (e.g., the base station 105) for additional uplink BWPs.

Figure 2:
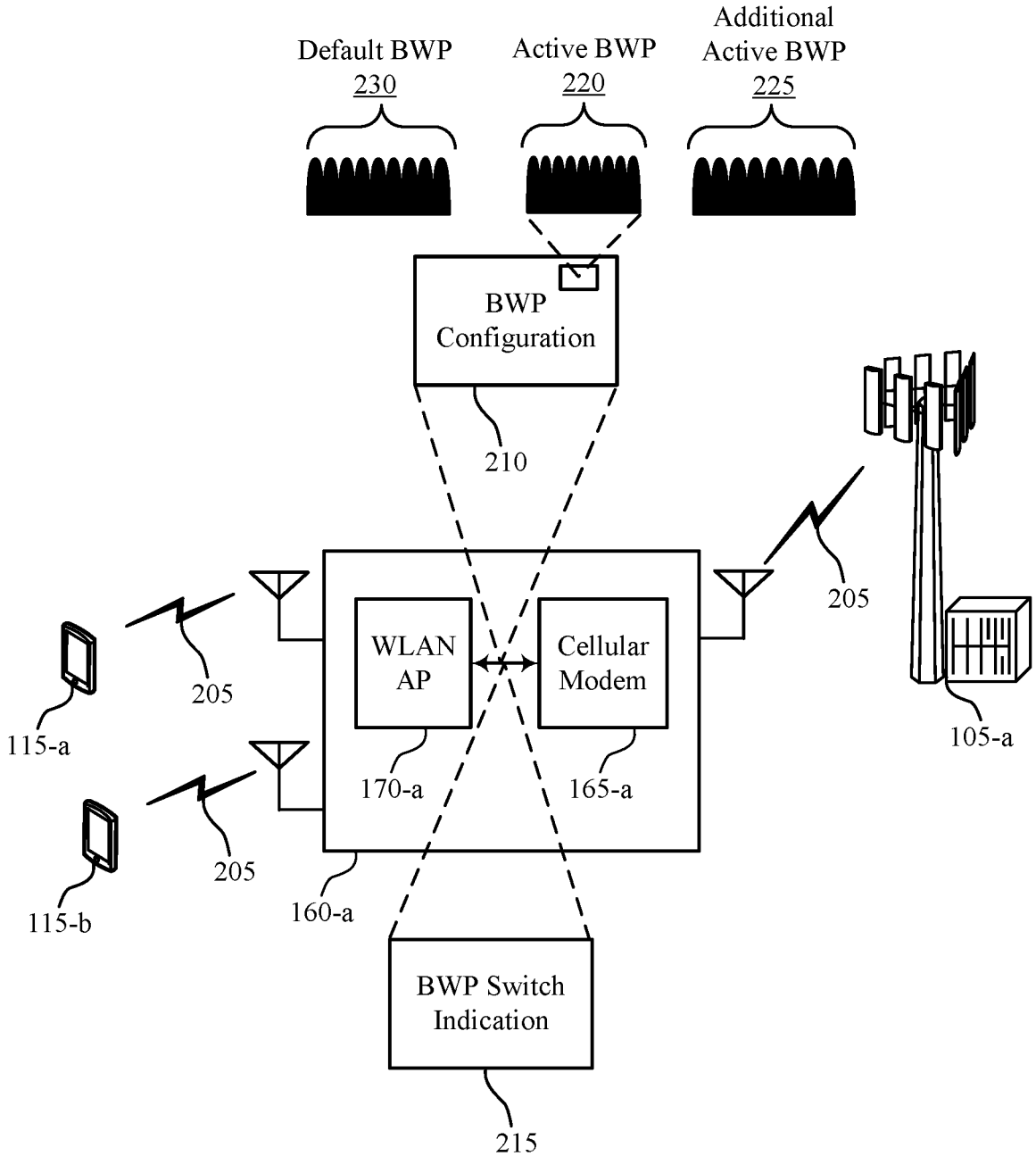

FIG. 2 illustrates an example of a wireless communications system 200 that supports techniques for data transfer using BWPs for wireless access in accordance with one or more aspects of the present disclosure. In some examples, the wireless communications system 200 may implement aspects of the wireless communications system 100 or may be implemented by aspects of the wireless communications system 100. For example, the wireless communications system 200 may include a base station 105-*a*, a UE 115-*a*, a UE 115-*b*, and a CPE 160-*a* (such as a 5G CPE). The base station 105, the UEs 115, and the CPE 160 may be examples of corresponding devices described herein with reference to FIG. 1.

In some examples, the wireless communications system 200 may support multiple radio access technologies including Wi-Fi, 4G systems such as LTE systems, LTE-A systems, or LTE-A Pro systems, and 5G systems, which may be referred to as NR systems. The wireless communications system 200 may also affect power consumption, spectral efficiency, higher data rates and, in some examples, may promote enhanced efficiency for higher reliability and lower latency wireless communications (e.g., uplink transmission, downlink transmission, uplink reception, and downlink reception).

The CPE 160-*a* may include a cellular modem 165-*a* (e.g., a 5G modem, or another modem support other radio access technology (such as, 6G), etc.) and a WLAN AP 170-*a*. The CPE 160-*a* may provide network coverage for a WLAN. The CPE 160-*a* and the UEs 115 may be part of a WLAN (e.g., a Wi-Fi network) and communicate over communication links 205. That is, the CPE 160-*a* and the UEs 115 may communicate over Wi-Fi. The CPE 160-*a* and the UEs 115 may communicate over communication links 205, which may be an example of an Ethernet link, a WLAN link according to IEEE 802.11, or a cellular link (e.g., a 5G link). In some examples, the CPE 160-*a* may communicate with the UEs 115 using the WLAN AP 170-*a* of the CPE 160-*a* and over the communication links 205 (e.g., a WLAN link). In some other examples, the CPE 160-*a* may communicate with the UEs 115 using the cellular modem 165-*a* of the CPE 160-*a* and over the communication links 205 (e.g., a 5G link or another radio access technology). In some examples, the CPE 160-*a* may communicate with the network, for example, the base station 105-*a* over the communication links 205 (e.g., a 5G link) and other components of a core network as described herein with reference to FIG. 3.

In some examples, the CPE 160-*a* may enable exchange of various information between a Wi-Fi scheduler of the WLAN AP 170-*a* of the CPE 160-*a* and a 5G connection manager of the cellular modem 165-*a* of the CPE 160-*a*, such that the 5G connection manager can dynamically adjust a bandwidth for the WLAN AP 170-*a*. For example, the cellular modem 165-*a* may receive, from the WLAN AP 170-*a*, an indication of a BWP configuration 210 identifying an active BWP 220 for wireless communication, for example, with one or more of the UE 115-*a* and the UE 115-*b*. In some examples, the cellular modem 165-*a* may signal, to the WLAN AP 170-*a*, a BWP switch indication 215 to switch to the active BWP 220 for the wireless communication using the WLAN AP 170-*a* based on the BWP configuration. The CPE 160-*a* may then communicate with one or more of the UE 115-*a* and the UE 115-*b* (also referred to as STAs) using the WLAN AP 170-*a* and in accordance with the active BWP 220.

In some examples, the cellular modem 165-*a* may monitor one or more WLAN events (also referred to as Wi-Fi events) associated with the WLAN AP 170-*a* as described herein. In some examples, the CPE 160-*a* may communicate with one or more of the UE 115-*a* and the UE 115-*b* based on the monitoring of the one or more WLAN events associated with the WLAN AP 170-*a*. The cellular modem 165-*a* may receive, from the WLAN AP 170-*a*, an indication of a congestion at the WLAN AP 170-*a*, for example, based on one or more traffic flows for one or more of the cellular modem 165-*a* or the WLAN AP 170-*a* over one or more occasions (e.g., periods). In some cases, the cellular modem 165-*a* may reset an inactivity timer based on the congestion at the WLAN AP 170-*a* over one or more subsequent occasions (e.g., periods).

The cellular modem 165-*a* may receive, from the WLAN AP 170-*a*, a request for one or more additional BWPs 225 based on one or more traffic flows for one or more of the cellular modem 165-*a* or the WLAN AP 170-*a* exceeding the active BWP 220 for the wireless communication. In some examples, the CPE 160-*a* may communicate with one or more of the UE 115-*a* and the UE 115-*b* using the WLAN AP 170-*a* and in accordance with the one or more additional BWPs 225. The cellular modem 165-*a* may allocate the one or more additional BWPs 225 for the one or more traffic flows based on the request for the one or more additional BWPs 225.

In some examples, the cellular modem 165-*a* may transmit, to the WLAN AP 170-*a*, the BWP switch indication 215 to switch to a default BWP 203 for the wireless communication based on an inactivity timer expiring (e.g., an uplink inactivity timer). The CPE 160-*a* may then communicate with one or more of the UE 115-*a* and the UE 115-*b* using the WLAN AP 170-*a* and in accordance with the default BWP 230. In some cases, the cellular modem 165-*a* may reset an inactivity timer based on an absence of receiving an additional request for the one or more additional BWPs 225 during one or more occasions based at least in part on the one or more traffic flows for one or more of the cellular modem 165-*a* or the WLAN AP 170-*a* exceeding the active BWP 220.

Figure 3:
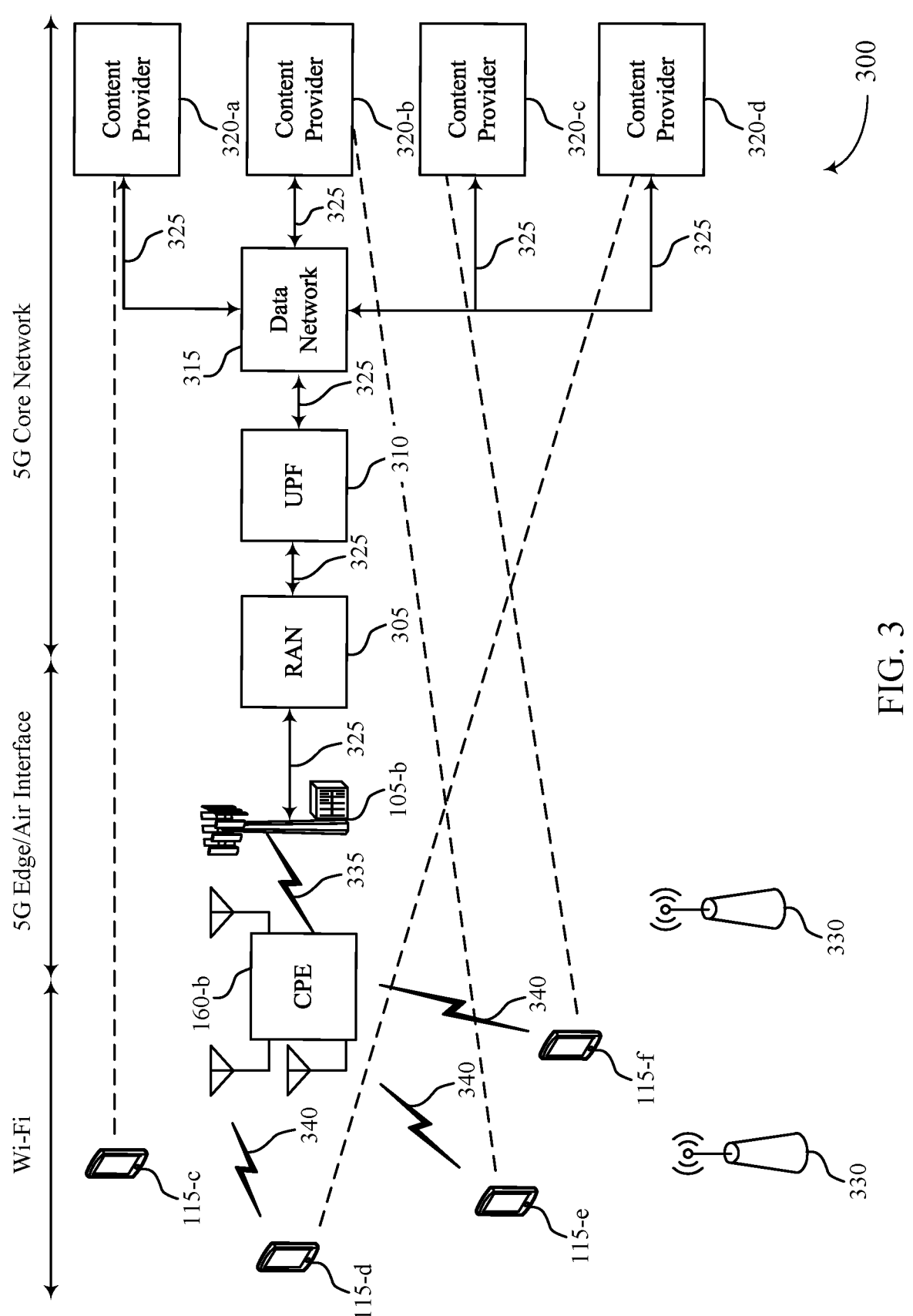

FIG. 3 illustrates an example of a wireless communications system 300 that supports techniques for data transfer using BWPs for wireless access in accordance with one or more aspects of the present disclosure. In some examples, the wireless communications system 200 may implement aspects of the wireless communications system 100 or may be implemented by aspects of the wireless communications system 100. For example, the wireless communications system 300 may include a base station 105 and multiple UEs 115 (also referred to as STAs) including a UE 115-*c*, a UE 115-*d*, a UE 115-*e*, and a UE 115-*f*. The base station 105 and the UEs 115 may be examples of corresponding devices described herein with reference to FIG. 1.

In some examples, the wireless communications system 300 may support multiple radio access technologies including WLAN (e.g., Wi-Fi network), 4G systems such as LTE systems, LTE-A systems, or LTE-A Pro systems, and 5G systems, which may be referred to as NR systems. The wireless communications system 300 may also affect power consumption, spectral efficiency, higher data rates and, in some examples, may promote enhanced efficiency for higher reliability and lower latency wireless communications (e.g., uplink transmission, downlink transmission, uplink reception, and downlink reception).

The wireless communications system 300 may also include a CPE 160-*b*, which may be an example of a CPE as described herein with reference to FIG. 1. For example, the CPE 160-*b* may be a 5G-CPE including a WLAN AP and a cellular modem (e.g., a 5G modem or another modem supporting other radio access technologies, such as 6G). The CPE 160-*b* may provide network coverage for a WLAN. The CPE 160-*b* and the UEs 115 may be part of a WLAN (e.g., a Wi-Fi network) and communicate over communication links 340. That is, the CPE 160-*b* and the UEs 115 may communicate over Wi-Fi. The CPE 160-*b* and the UEs 115 may communicate over communication links 340, which may be an example of an Ethernet link, a WLAN link according to IEEE 802.11, or a cellular link (e.g., a 5G link). In some examples, the CPE 160-*b* may communicate with the UEs 115 using a WLAN AP of the CPE 160-*b* and over the communication links 340 (e.g., a WLAN link). In some other examples, the CPE 160-*b* may communicate with the UEs 115 using a cellular modem of the CPE 160-*b* and over the communication links 340 (e.g., a 5G link).

In some examples, the CPE 160-*b* may communicate with the base station 105-*b* over a 5G edge air interface. The base station 105-*b* may provide or access a 5G NR network. In some examples, the CPE 160-*b* may communicate with the base station 105-*b* using a communication link 335. The base station 105-*b* may communicate with a radio access network (RAN) 305 using a wired or wireless communication link 325. The RAN 305 may communicate with a user plane function (UPF) 310 using a wired or wireless communication link 325. The UPF 310 may communicate with a data network 315 (e.g., a public data network or a private data network) using a wired or wireless communication link 325.

The data network 315 may be configured to access multiple content providers 320 (or application providers). Examples of content or applications include streaming services, augmented reality applications, virtual reality applications, mixed reality applications, remote healthcare applications (such as remote surgery applications), Internet access, etc. The data network 315 may communicate with a content provider 320-*a* using a wired or wireless communication link 325. Additionally, or alternatively, the data network 315 may communicate with a content provider 320-*b* using a wired or wireless communication link 325, a content provider 320-*c* using a wired or wireless communication link 325, or a content provider 320-*d* using a wired or wireless communication link 325. One or more of the RAN 305, the UPF 310, the data network 315, and one or more of the content providers 320 may be part of a 5G core network.

In the example of FIG. 3, the wireless communication system 300 may support network slicing. A network slice may include a set of network functions and resources with each network slice including a service layer, a network function layer, and a logical network layer. By defining network slices, the wireless communication system 300 can designate different quality of service (QoS) or configurations for each service. While resources may be shared across network slices, capabilities such as data speed, capacity, connectivity, quality, latency, reliability, and services can be customized in each slice to conform to the service. In some examples, the wireless communication system 300 may be configured to offer different services to applications based on network slices. For example, a network slice can be an end-to-end logical tunnel between an application hosted on a UE 115 (such as one or more of the UEs 115-*c* through 115-*f*) and a content provider 320 (such as one or more of the content providers 320-*a* through 320-*d*).

The UEs 115 (e.g., one or more of the UE 115-*c*, the UE 115-*d*, the UE 115-*e*, and the UE 115-*f*) may host different applications. For example, an application hosted in the UE 115-*c* may be associated with the content provider 320-*a*. Likewise, an application hosted in the UE 115-*d* may be associated with the content provider 320-*d*, an application hosted in the UE 115-*e* may be associated with the content provider 320-*b*, and an application hosted in the UE 115-*f* may be associated with the content provider 320-*c*. In some cases, the UEs 115 (e.g., one or more of the UE 115-*c*, the UE 115-*d*, the UE 115-*e*, and the UE 115-*f*) may utilize different network slices to access different client applications.

In some cases, one or more WLAN APs 330 may increase a channel congestion in the wireless communications system 300. For example, one or more of the WLAN APs 330 may have an overlapping basic service set (OBSS) with a basic service set (BSS) of the CPE 160-*b* (e.g., the WLAN AP of the CPE 160-*b*). One or more of the WLAN APs 330 may be part an extended service set (ESS), which allow multiple APs 105 to be connected in an ESS. As described herein, the CPE 160-*b* may include a cellular modem (e.g., a 5G modem) and a WLAN AP. The cellular modem of the CPE 160-*b* may be configured to dynamically change bandwidth using BWPs when traffic flows change. For example, the cellular modem of the CPE 160-*b* may be configured to allocate more or less bandwidth for when uplink traffic increases or decreases. However, the WLAN AP of the CPE 160-*b* may be unaware of the bandwidth management at the cellular modem of the CPE 160-*b*, which may result in poor user experience as well as sub-optimal power management at the CPE 160-*b*. It thus may be desirable to provide cellular modem awareness for the WLAN AP of the CPE 160-*b* so that the cellular modem of the CPE 160-*b* may also dynamically adjust the bandwidth capability for the WLAN AP of the CPE 160-*b*. As such, the CPE 160-*b* may appropriately manage the channel congestion in the wireless communications system 300.

For example, the CPE 160-*b* may be configured to enable the exchange of various information between a Wi-Fi scheduler of a WLAN AP of the CPE 160-*b* and a 5G connection manager of a 5G modem of the CPE 160-*b*, such that the 5G connection manager can dynamically adjust a bandwidth for the WLAN AP. For example, the Wi-Fi scheduler of the WLAN AP of the CPE 160-*b* may calculate an available uplink capacity and schedule uplink client with 5G traffic flows. In some cases, when the Wi-Fi scheduler of the WLAN AP of the CPE 160-*b* determines that a Wi-Fi channel is busy for 5G traffic flows, the Wi-Fi scheduler can indicate a Wi-Fi channel congestion to the 5G connection manager of the 5G modem of the CPE 160-*b*. Based on this indication, the 5G connection manager can reset an uplink inactivity timer. In some case, when Wi-Fi scheduler of the WLAN AP of the CPE 160-*b* determines that a buffer is busy for 5G traffic flows, the Wi-Fi scheduler can indicate a request for additional bandwidth from the 5G connection manager of the 5G modem of the CPE 160-*b*. The 5G connection manager may thus inform the network (e.g., the RAN 305 for additional uplink BWPs.

Figure 4:
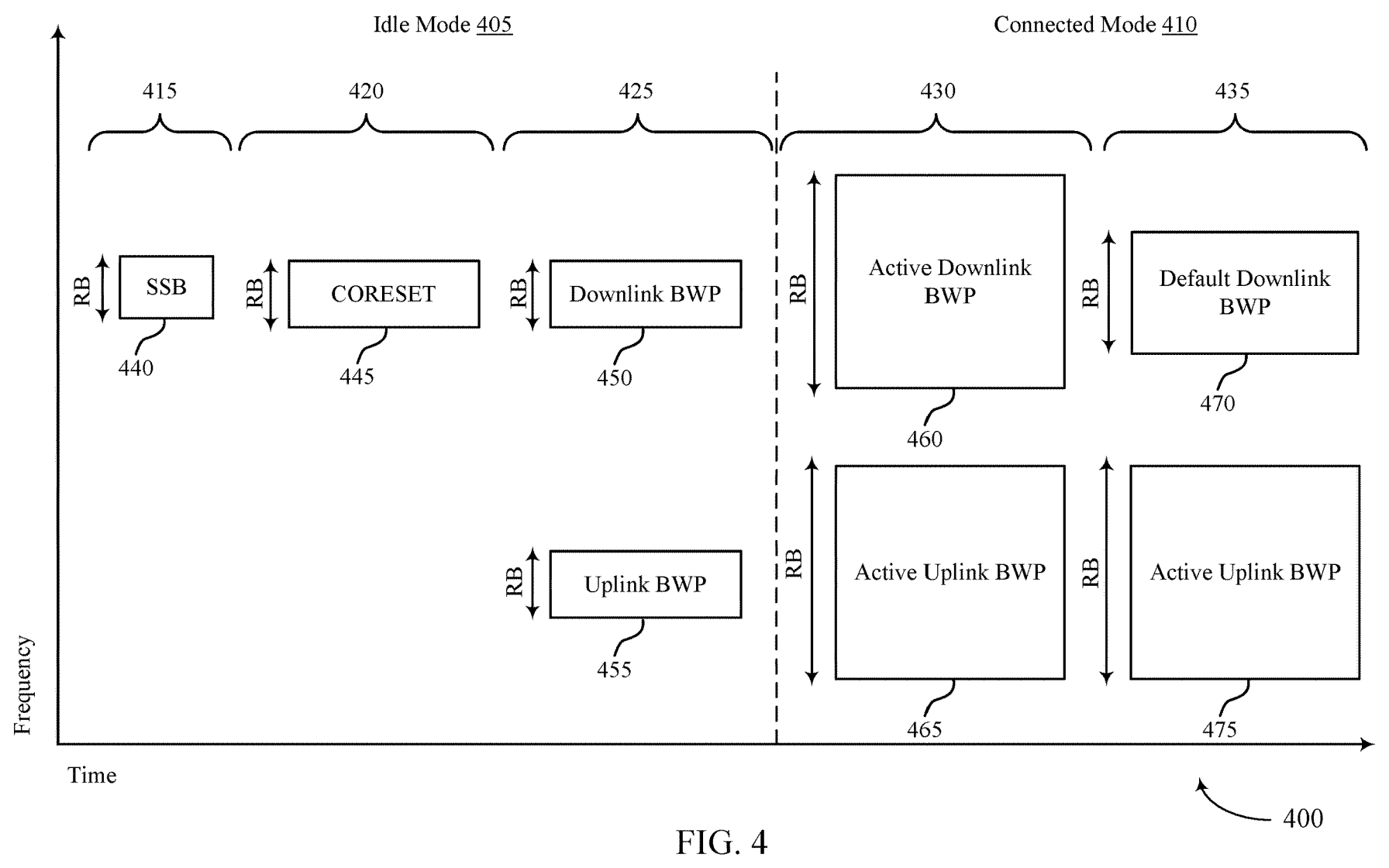

FIG. 4 illustrates an example of a BWP adaptation timeline 400 that supports techniques for data transfer using BWPs for wireless access in accordance with one or more aspects of the present disclosure. The BWP adaptation timeline 400 may implement aspects of the wireless communications systems 100, 200, and 300 or may be implemented by aspects of the wireless communications systems 100, 200, and 300 as described herein with reference to FIGS. 1 through 3, respectively. For example, the BWP adaptation timeline 400 may be based on a configuration by a base station 105, which may be implemented by a UE 115. In some examples, the base station 105 may be an example of a CPE, such as a 5G CPE or other modem supporting other radio access technologies, such as 4G, 6G, etc.

In the example of FIG. 4, a UE 115 may operate in one or more of an idle mode 405 and a connected mode 410. For example, when the UE 115 does not have any data to transmit or receive the UE 115 may operate in the idle mode 405. Otherwise, when the UE has data to transmit or receive the UE 115 may operate in the connected mode 410. At 415 of the BWP adaptation timeline 400, the UE 115 may perform synchronization and acquire a master information block (MIB), which may carry information, such as a system bandwidth information. In some examples, the UE 115 may receive the MIB via a synchronization signal block (SSB) 440, which may be received by the UE 115 on one or more resource blocks (RB). For example, the SSB 440 may span 20 RBs.

At 420 of the BWP adaptation timeline 400, the UE 115 may acquire system information. For example, the UE 115 may acquire a system information block (SIB) (e.g., a SIB1), which may include information relevant when evaluating if the UE 115 is allowed to access a cell and defines the scheduling of other system information. In some examples, the UE 115 may search a control region (e.g., a control resource set (CORESET) 445) for a physical control channel carrying the SIB. The CORESET 445 may be defined by a number of RBs (e.g., 24 RBs) and may extend across a system bandwidth or a subset of the system bandwidth. The UE 115 may thus monitor or search the CORESET 445 to receive and decode the SIB1.

At 425 of the BWP adaptation timeline 400, the UE 115 may perform a random-access procedure. The UE 115 may perform the random-access procedure to access a network (e.g., a base station 105). Examples of reasons for performing the random-access procedure by the UE 115 include initial access, handover, scheduling request, and timing synchronization, among other examples. As part of the random-access procedure, the UE 115 may exchange one or more handshake messages (e.g., random access messages) associated with the random-access procedure with a base station 105 over a downlink BWP 450 and an uplink BWP 455. One or more of the downlink BWP 450 and the uplink BWP 455 may be configured by the SIB 1. The SIM may configure RBs of one or more of the downlink BWP 450 and the uplink BWP 455. For example, the downlink BWP 450 and the uplink BWP 455 may each span 24 RBs based on the SIB1 configuration.

At 430 of the BWP adaptation timeline 400, the UE 115 may switch from operating in the idle mode 405 to operating in the connected mode 410. In the connected mode 410, the UE 115 may support wireless communication over one or more of an active downlink BWP 460 and an active uplink BWP 465. One or more of the active downlink BWP 460 and the active uplink BWP 465 may be configured (e.g., via RRC configuration) to span a number of RBs (e.g., 270 RBs). At 435 of the BWP adaptation timeline 400, the UE 115 (and the base station 105) may switch to a default downlink BWP 470, which may span less number of RBs (e.g., 52 RBs) compared to the active downlink BWP. In some examples, the UE 115 (and the base station 105) may switch to the default downlink BWP 470 based on an inactivity timer expiring. While the UE 115 (and the base station 105) may switch to the default downlink BWP 470, the UE 115 may still perform wireless communications (e.g., in the uplink) with the base station 105 over an active uplink BWP 475, which may span a number of RBs (e.g., 270 RBs).

Figure 5:
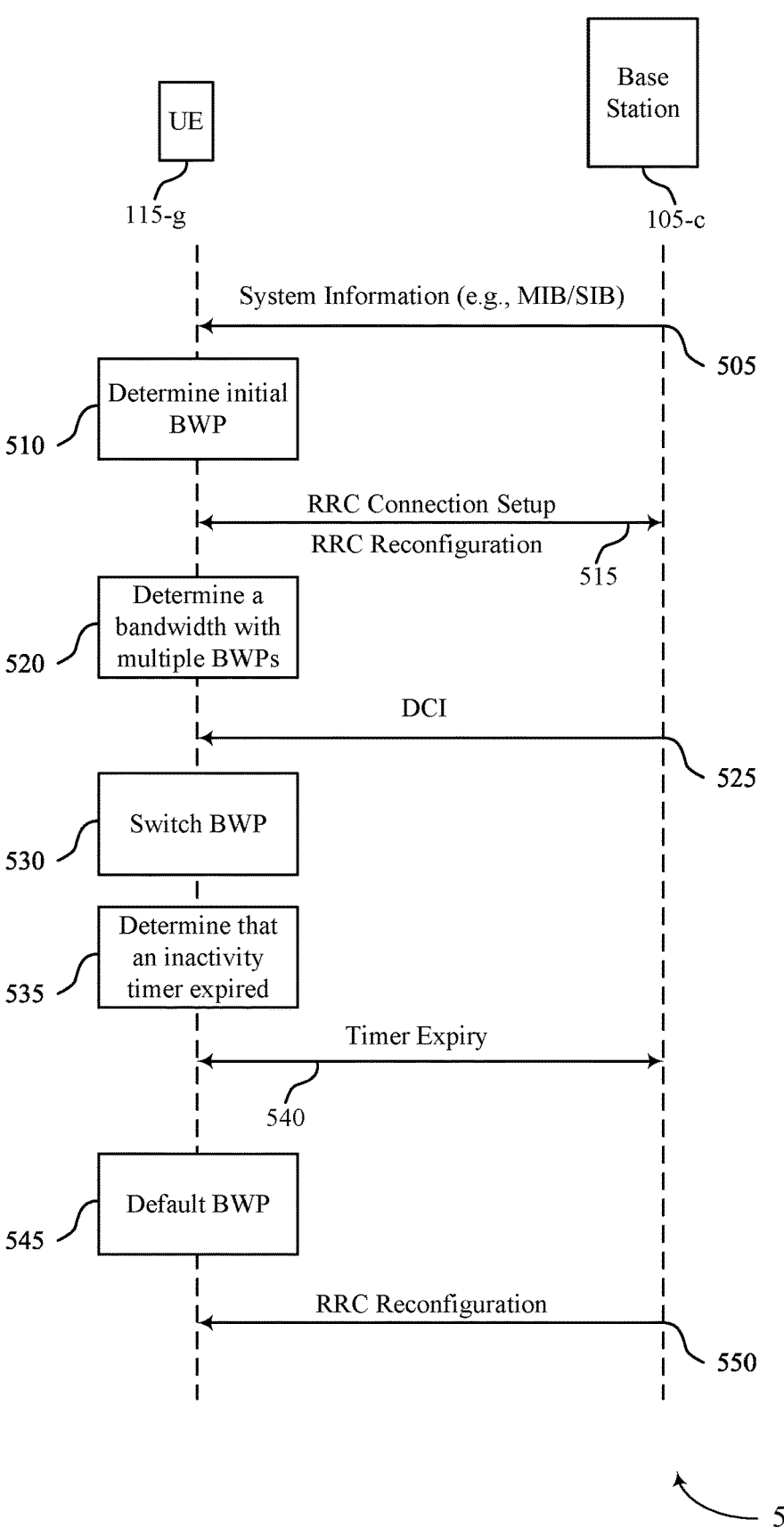
FIG. 5 illustrates an example of a process flow that supports techniques for data transfer using BWPs for wireless access in accordance with one or more aspects of the present disclosure.

FIG. 5 illustrates an example of a process flow 500 that supports techniques for data transfer using BWPs for wireless access in accordance with one or more aspects of the present disclosure. The process flow 500 may implement aspects of the wireless communications systems 100, 200, and 300 or may be implemented by aspects of the wireless communications systems 100, 200, and 300 as described herein with reference to FIGS. 1 through 3, respectively. For example, the process flow 500 may be based on a configuration by a base station 105-*c* (e.g., a 5G CPE), which may be implemented by a UE 115-*g*. The base station 105-*c* and the UE 115-*g* may be examples of a base station 105 and a UE 115, as described herein with reference to FIGS. 1 through 4.

At 505, the base station 105-*c* may transmit, to the UE 115-*g*, system information. For example, the base station 105-*c* may transmit, to the UE 115-*g*, one or more of a MIB and a SIB. At 510, the UE 115-*g* may determine an initial BWP based on the received system information, such as one or more of a MIB and a SIB. In some examples, the initial BWP may be an initial downlink BWP or an initial uplink BWP, or both. At 515, the base station 105-*c* may perform an RRC connection setup with the UE 115-*g*, in which the base station 105-*c* may provide the UE 115-*g* with an RRC reconfiguration. The RRC reconfiguration may configure (e.g., allocate) one or more additional BWPs for the UE 115-*g*.

At 520, the UE 115-*g* may determine a bandwidth with multiple BWPs. For example, the UE 115-*g* may determine the multiple BWPs based at least in part on the RRC reconfiguration from the base station 105-*c*. In the case of fixed wireless access, a cellular modem (e.g., a 5G modem) of the base station 105-*c* (e.g., a 5G CPE) may require awareness and coordination with a WLAN AP of the base station 105-*c* to increase 5G network efficiency and user experience at the UE 115-*g*. At 525, the base station 105-*c* may transmit, to the UE 115-*g*, a downlink control information (DCI) that triggers (or enables) the UE 115-*g* to switch a BWP.

At 530, the UE 115-*g* may switch a BWP, for example, based at least in part on the received DCI from the base station 105-*c*. At 535, the UE 115-*g* may determine that an inactivity timer expired. At 540, the base station 105-*c* and the UE 115-*g* may signal the expiration of the inactivity timer. At 545, the UE 115-*g* may switch to a default BWP for wireless communication, for example, based at least in part on the expiration of the inactivity timer. At 550, the base station 105-*c* provide the UE 115-*g* with an RRC reconfiguration, as a result of the expiration of the inactivity timer. One or more of the above operations may be performed in different orders, at different times, or repeated (e.g., BWP transitions). Some operations may also be omitted from the process flow 500, and other operations may be added to the process flow 500.

FIG. 6 illustrates an example of a BWP switching timeline 600 that supports techniques for data transfer using BWPs for wireless access in accordance with one or more aspects of the present disclosure. The BWP switching timeline 600 may implement aspects of the wireless communications systems 100, 200, and 300 or may be implemented by aspects of the wireless communications systems 100, 200, and 300 as described herein with reference to FIGS. 1 through 3, respectively. For example, the BWP switching timeline 600 may be based on a configuration by a base station 105, which may be implemented by a UE 115. In some examples, the base station 105 may be an example of a CPE, such as a 5G CPE or other modem supporting other radio access technologies, such as 4G, 6G, etc.

In the example of FIG. 6, a UE 115 may acquire a cell on an initial BWP 605. For example, a base station 105 may transmit synchronization signals, such as an SSB 620. The UE 115 may receive system information (e.g., MIB, SIB) via the SSB 620 on the initial BWP 605. The base station 105 and the UE 115 may perform a connection procedure, such as an RRC connection setup procedure (e.g., RRC configuration 635), in which the base station 105 configures the UE 115 with a number of BWPs. For example, the base station 105 may configure the UE 115 with a default BWP 630 and one or more active BWPs (such as an active BWP 610 and an active BWP 615). In some examples, the base station 105 may transmit, to the UE 115, a DCI that may carry an indication for the UE 115 to switch BWPs. For example, based at least in part on the received DCI, the UE 115 may switch from the active BWP 610 to the active BWP 615. Additionally or alternatively, the base station 105 and the UE 115 may be configured to switch BWPs based on other conditions. For example, the UE 115 may switch from the active BWP 615 to the default BWP 630 based at least in part on an inactivity timer expiring.

FIG. 7 illustrates an example of a scheduler pipeline 700 that supports techniques for data transfer using BWPs for wireless access in accordance with one or more aspects of the present disclosure. The scheduler pipeline 700 may implement aspects of the wireless communications systems 100, 200, and 300 or may be implemented by aspects of the wireless communications systems 100, 200, and 300 as described herein with reference to FIGS. 1 through 3, respectively. For example, the scheduler pipeline 700 may be implemented by a device, for example a CPE. For fixed wireless access, a Wi-Fi scheduler of a CPE may be aware of BWP capability of a cellular modem (e.g., a 5G modem or other modem supporting other radio access technologies) of the CPE to maximize a user-experience along with efficient network access.

The scheduler pipeline 700 may include a traffic flow information analysis 705, which may analyze traffic flow information (also referred to as Wi-Fi traffic flow) for scheduling traffic (e.g., data in the form of packets) for transmission or reception at the device. In some examples, the traffic flow information analysis 705 may analyze channel access delay and delay requirements for each traffic flow in queue for transmission or reception at the device. In some other examples, the traffic flow information analysis 705 may analyze throughput and throughput requirements for each traffic flow in queue for transmission or reception at the device. Additionally or alternatively, the traffic flow information analysis 705 may analyze other information such as physical (PHY) rate, previous throughput and throughput requirements for each traffic flow in queue for transmission or reception at the device, or airtime percentage requirements for each traffic flow in queue for transmission or reception at the device, or any combination thereof.

In some examples, the scheduler pipeline 700 may include a QoS scheduler 710, which may receive traffic flow information from the traffic flow information analysis 705. The QoS scheduler 710 may schedule for each traffic flow in queue for transmission or reception at the device based at least in part on a QoS requirement for each traffic flow. The scheduler pipeline 700 may include a scheduling information analysis 715, which may receive QoS information from the QoS scheduler 710. The scheduling information analysis 715 may be configured to analyze scheduling results as per STA information (e.g., per UE 115 information) for grouping traffic flows. For example, the scheduling information analysis 715 may determine scheduling weights of all traffic flows. Additionally, the scheduling information analysis 715 may order the traffic flows based at least in part on the scheduling weights assigned to each traffic flow of all the traffic flows. The scheduling information analysis 715 may then generate determine a list of traffic flows based on the ordered traffic flows.

The scheduler pipeline 700 may include a transmit mode selector 720, which may support transmission mode and candidate pool selection for scheduling each traffic flow of the traffic flows. In some examples, the transmit mode selector 720 may evaluate primary access 725 information and STA capabilities 730 (e.g., UE 115 capabilities). Based on the primary access 725 information, the STA capabilities 730, or the ordered traffic flows information received from the scheduling information analysis 715, or any combination thereof, the transmit mode selector 720 may schedule and group traffic flows accordingly. For example, the transmit mode selector 720 may distribute individual or grouped traffic flows to a transmit scheduler 735, which may include one or more of a multiple user (MU) MIMO (MU-MIMO) scheduler (e.g., for downlink and uplink), an OFDMA scheduler, or a single-user (SU) scheduler.

In some examples, the scheduler pipeline 700 may include a grouping information analysis 740, which may be configured to update traffic flow information. For example, the grouping information analysis 740 may determine grouping results based on a transmit mode (e.g., MU-MIMO, OFDMA, SU), a list of STAs e.g., a list of STAs for transmission), a resource unit (RU) allocation (e.g., for OFDMA transmission), or a modulation and coding scheme (MCS) for each STA, or any combination thereof. The scheduler pipeline 700 may include a statistics per traffic flow 745, which may update per traffic flow historic statistics of one or more of the above parameters described (e.g., QoS, transmit mode, MCS).

FIG. 8 illustrates an example of a scheduler pipeline 800 that supports techniques for data transfer using BWPs for wireless access in accordance with one or more aspects of the present disclosure. The scheduler pipeline 800 may implement aspects of the wireless communications systems 100, 200, and 300 or may be implemented by aspects of the wireless communications systems 100, 200, and 300 as described herein with reference to FIGS. 1 through 3, respectively. For example, the scheduler pipeline 800 may be implemented by a device, for example a CPE. In the example of FIG. 8, 5G WAN traffic flows with similar QoS are grouped into 5G traffic flows.

The scheduler pipeline 800 may include a traffic flow information analysis 805, which may analyze traffic flow information (also referred to as Wi-Fi traffic flow) for scheduling traffic (e.g., data in the form of packets) for transmission or reception at the device. In some examples, the traffic flow information analysis 805 may analyze channel access delay and delay requirements for each traffic flow in queue for transmission or reception at the device. In some other examples, the traffic flow information analysis 805 may analyze throughput and throughput requirements for each traffic flow in queue for transmission or reception at the device. Additionally or alternatively, the traffic flow information analysis 805 may analyze other information such as physical (PHY) rate, previous throughput and throughput requirements for each traffic flow in queue for transmission or reception at the device, or airtime percentage requirements for each traffic flow in queue for transmission or reception at the device, or any combination thereof.

In some examples, the scheduler pipeline 700 may include a QoS scheduler 810, which may receive traffic flow information from the traffic flow information analysis 805. The QoS scheduler 810 may schedule for each traffic flow in queue for transmission or reception at the device based at least in part on a QoS requirement for each traffic flow. The scheduler pipeline 700 may include a scheduling information analysis 815, which may receive QoS information from the QoS scheduler 810. The scheduling information analysis 815 may be configured to analyze scheduling results as per STA information (e.g., per UE 115 information) for grouping traffic flows. For example, the scheduling information analysis 815 may determine scheduling weights of all traffic flows. Additionally, the scheduling information analysis 815 may order the traffic flows based at least in part on the scheduling weights assigned to each traffic flow of all the traffic flows. The scheduling information analysis 815 may then generate determine a list of traffic flows based on the ordered traffic flows.

The scheduler pipeline 700 may include a transmit mode selector 820, which may support transmission mode and candidate pool selection for scheduling each traffic flow of the traffic flows. In some examples, the transmit mode selector 820 may evaluate primary access 825 information and STA capabilities 830 (e.g., UE 115 capabilities). Additionally, the transmit mode selector 820 may evaluate 5G traffic flows 835, which include 5G WAN traffic flows with similar QoS grouped into 5G group traffic flows. Based on the primary access 825 information, the STA capabilities 830, the ordered traffic flows information received from the scheduling information analysis 815, or the 5G traffic flows 835 or any combination thereof, the transmit mode selector 820 may schedule and group traffic flows accordingly. For example, the transmit mode selector 820 may distribute individual or grouped traffic flows to a transmit scheduler 840, which may include one or more of a MU-MIMO scheduler (e.g., for downlink and uplink), an OFDMA scheduler, or an SU scheduler, or any combination thereof.

In some examples, the scheduler pipeline 700 may include a grouping information analysis 845, which may be configured to update traffic flow information. For example, the grouping information analysis 845 may determine grouping results based on a transmit mode (e.g., MU-MIMO, OFDMA, SU), a list of STAs (e.g., a list of STAs for transmission), a resource unit (RU) allocation (e.g., for OFDMA transmission), or a MCS 880 for each STA, or any combination thereof. The scheduler pipeline 700 may include a statistics per traffic flow 850, which may update per traffic flow historic statistics of one or more of the above parameters described (e.g., QoS, transmit mode, MCS) including 5G traffic flows.

FIG. 9 illustrates an example of a process flow 900 that supports techniques for data transfer using BWPs for wireless access in accordance with one or more aspects of the present disclosure. The process flow 900 may implement aspects of the wireless communications systems 100, 200, and 300 or may be implemented by aspects of the wireless communications systems 100, 200, and 300 as described herein with reference to FIGS. 1 through 3, respectively. For example, the process flow 900 may be implemented by a device, such as a CPE. The CPE may include a cellular modem 165-*b* and a WLAN AP 170-*b*, which may be examples of a cellular modem 165 and a WLAN AP 170, as described herein. One or more operations by the cellular modem 165-*b* and the WLAN AP 170-may be performed in different orders, at different times, or repeated (e.g., BWP transitions). Some operations may also be omitted from the process flow 900, and other operations may be added to the process flow 900.

At 905, the cellular modem 165-*b* of the CPE may determine an initial BWP as described herein. As such, 5G WAN may begin with the initial BWP. At 910, the cellular modem 165-*b* of the CPE may communicate the initial BWP (e.g., uplink and downlink initial BWP) to the WLAN AP 170-*b* of the CPE. For example, the cellular modem 165-*b* of the CPE may communicate the initial BWP to a Wi-Fi scheduler of the WLAN AP 170-*b* of the CPE. At 915, the cellular modem 165-*b* of the CPE may determine a dynamic BWP configuration, for example, due to a network configuring a BWP dynamically. At 920, the cellular modem 165-*b* of the CPE may be reconfigured based on the dynamic BWP configuration. At 925, the cellular modem 165-*b* of the CPE may communicate BWP information (e.g., different uplink and downlink BWP) to the WLAN AP 170-*b* of the CPE. For example, the cellular modem 165-*b* of the CPE may communicate a new BWP to a Wi-Fi scheduler of the WLAN AP 170-*b* of the CPE.

At 930, the cellular modem 165-*b* of the CPE may determine that an inactivity timer expired. As a result, at 935, the cellular modem 165-*b* of the CPE may switch to a default BWP. At 940, the cellular modem 165-*b* of the CPE may communicate BWP information (e.g., default uplink and downlink BWP) to the WLAN AP 170-*b* of the 5CPE. For example, the cellular modem 165-*b* of the CPE may communicate a default BWP to a Wi-Fi scheduler of the WLAN AP 170-*b* of the CPE. The process flow 900 thus support a cellular modem of a CPE communicating BWP changes dynamically to a WLAN AP (e.g., a Wi-Fi scheduler) of the CPE.

FIG. 10 illustrates an example of a process flow 1000 that supports techniques for data transfer using BWPs for wireless access in accordance with one or more aspects of the present disclosure. The process flow 1000 may implement aspects of the wireless communications systems 100, 200, and 300 or may be implemented by aspects of the wireless communications systems 100, 200, and 300 as described herein with reference to FIGS. 1 through 3, respectively. For example, the process flow 1000 may be implemented by a device, such as a CPE. The CPE may include a cellular modem 165-*c* and a WLAN AP 170-*c*, which may be examples of a cellular modem 165 and a WLAN AP 170, as described herein. In the following description of the process flow 1000, the operations may be performed in different orders or at different times. Some operations may also be omitted from the process flow 1000, and other operations may be added to the process flow 1000.

The process flow 1000 may support signaling between the cellular modem 165-*c* of the CPE and the WLAN AP 170-*c* of the CPE. The process flow 1000 may support signaling between the cellular modem 165-*c* of the CPE and the WLAN AP 170-*c* of the CPE of a dynamic change in bandwidth (e.g., change in BWPs). The process flow 1000 may also support signaling between the cellular modem 165-*c* of the CPE and the WLAN AP 170-*c* of the CPE of a Wi-Fi channel congestion notification (e.g., reset uplink inactivity timer for BWP). Additionally or alternatively, the process flow 1000 may also support signaling between the cellular modem 165-*c* of the CPE and the WLAN AP 170-*c* of the CPE of a request for additional bandwidth based on Wi-Fi buffer status report (e.g., qdepth).

At 1005, the cellular modem 165-*c* of the CPE may determine whether there is a new BWP configured by the network (e.g., a base station 105). If there is a new BWP configured, the cellular modem 165-*c* of the CPE may signal to the WLAN AP 170-*c* of the CPE the new configured BWP. For example, a 5G connection manager of the cellular modem 165-*c* may signal to a Wi-Fi scheduler of the WLAN AP 170-*c* the new configured BWP. Otherwise, if there is no new BWP configured, the cellular modem 165-*c* of the CPE may monitor events, such as Wi-Fi events, at 1010. At 1015, the cellular modem 165-*c* of the CPE may determine that an inactivity timer has expired for a BWP (e.g., an uplink BWP).

At 1040, the WLAN AP 170-*c* of the CPE may determine that cellular group scheduling (e.g., 5G group scheduling) is active, and continue with monitoring uplink information (e.g., uplink stats) at 1045. In some examples, one or more of the cellular modem 165-*c* of the CPE and the WLAN AP 170-*c* of the CPE may mark and group 5G flows coming from a 5G PDN. One or more of the cellular modem 165-*c* of the CPE and the WLAN AP 170-*c* of the CPE may map the 5G flows towards Wi-Fi clients and invoke OFDMA by a setting a bit value in a field of a configuration (e.g., an arbitration inter-frame space number (AIFSN), such as AIFSN=0). The WLAN AP 170-*c* of the CPE, for example, the Wi-Fi scheduler of the WLAN AP 170-*c* may set an uplink permissible usable bandwidth to an uplink configured bandwidth as indicated by the cellular modem 165-*c* of the CPE. The WLAN AP 170-*c* of the CPE, for example, the Wi-Fi scheduler of the WLAN AP 170-*c* may monitor uplink stats for clients with 5G traffic flows.

At 1050, the WLAN AP 170-*c* of the CPE may calculate an available uplink capacity and schedule uplink clients (e.g., STAs, such as UEs 115) that have 5G traffic flows. For example, a Wi-Fi scheduler of WLAN AP 170-*c* may calculate an available uplink capacity and schedule uplink clients with 5G traffic flows using OFDMA. The WLAN AP 170-*c* of the CPE, for example, the Wi-Fi scheduler of the WLAN AP 170-*c* may monitor the available traffic capacity and only schedule clients or traffic flows within the cellular modem 165-*c* uplink capacity.

In some cases, the WLAN AP 170-*c* of the CPE may be faster than the cellular modem 165-*c* of the CPE. For example, a Wi-Fi airtime may be increased as traffic flow is more regulated on the Wi-Fi interface (e.g., WLAN AP 170-*c*) instead of dropping on the cellular modem 165-*c* (e.g., due to lack of bandwidth). In some other cases, the WLAN AP 170-*c* of the CPE may be slower than the cellular modem 165-*c* of the CPE. For example, due to a lack of data from Wi-Fi (e.g., WLAN AP 170-*c*) while cellular modem 165-*c* is configured for higher bandwidth, underutilization of the resources, scheduler quickly drops down the overall 5G scheduling for a given client (e.g., a UE 115).

The process flow 1000 may support efficient uplink traffic flows by adapting to radio uplink grants allowing for better QoS and less variations on the radio bandwidth scheduling management (e.g., uplink MCS, RB). The process flow 1000 may also support power saving by providing continuous scheduling that helps UE 115 to operate in better power performance state and less radio transitions which are tied to configuration parameters (e.g., fallback timers, back-off timers). Additionally or alternatively, the process flow 1000 may provide reduced latency by providing continuous scheduling that helps to minimize interruptions at traffic flow level, which affects an overall round trip time (RTT) at application level as well as layer-2 radio level, which affects latency.

At 1060, the WLAN AP 170-*c* of the CPE may determine whether a channel is busy. For example, the WLAN AP 170-*c* of the CPE may determine whether a channel is busy for 5G group uplink scheduling for a threshold number of scheduling cycles. If the WLAN AP 170-*c* of the CPE determines that a channel is busy for 5G group uplink scheduling for a threshold number of scheduling cycles, the WLAN AP 170-*c* of the CPE may generate an indication indicating a Wi-Fi congestion, at 1065. That is, the WLAN AP 170-*c* of the CPE may indicate Wi-Fi congestion to the cellular modem 165-*c* of the CPE. Otherwise, if the WLAN AP 170-*c* of the CPE determines that a channel is not busy for 5G group uplink scheduling for a threshold number of scheduling cycles, the WLAN AP 170-*c* may return to 5G group scheduling at 1040.

At 1020, the cellular modem 165-*c* of the CPE may determine whether there is Wi-Fi congestion. For example, the cellular modem 165-*c* of the CPE may determine whether there is Wi-Fi congestion based on the received indication from the WLAN AP 170-*c* of the CPE. If the cellular modem 165-*c* determines that there is Wi-Fi congestion, the cellular modem 165-*c* may reset an uplink timer at 1025. Otherwise, if the cellular modem 165-*c* determines that there is no Wi-Fi congestion, the cellular modem 165-*c* may return to monitoring events (e.g., Wi-Fi events) at 1010.

By signaling Wi-Fi congestion, the CPE may avoid a tear down or fallback of a BWP due to transient congestion on the Wi-Fi interface. In some cases, the tear down may result in a ripple effect (e.g., RRC re-configuration time, application transmission control protocol (TCP) scaling time), which may result in glitches on TCP-based applications. Additionally or alternatively, by signaling Wi-Fi congestion, the CPE may avoid application level adaptations to lower quality (e.g., video codec-rate adaptations to a lower quality) which takes more time to recover back at application level.

At 1070, the WLAN AP 170-*c* of the CPE may determine whether a 5G traffic flow buffer threshold is satisfied. For example, the WLAN AP 170-*c* of the CPE may determine if a qdepth for a 5G group repeatedly is satisfying a full buffer traffic for a number of occasions (e.g., iterations). If the WLAN AP 170-*c* of the CPE determines that the 5G traffic flow buffer threshold is satisfied, the WLAN AP 170-*c* may generate a request for additional BWPs at 1075, which may be signaled to the cellular modem 165-*c*. Otherwise, if the WLAN AP 170-*c* of the CPE determines that the 5G traffic flow buffer threshold is not satisfied, the WLAN AP 170-*c* may return to 5G group scheduling at 1040.

In some cases, because the WLAN AP 170-*c* may have higher priority data, the WLAN AP 170-*c* may convey additional bandwidth request to the cellular modem 165-*c* to help to utilize the additional functionality in the radio to negotiate for better resource management (e.g., buffer status report (BSR) reporting, BWP management, channel quality indicator (CQI) reporting) over the air. Additionally, the WLAN AP 170-*c* may avoid fallback to more power-saving states to ensure latency is prioritized. In some other cases, because the WLAN AP 170-*c* may have lower priority data, for example, due to any LAN based application stressing the resources (MIPS, Memory), the WLAN AP 170-*c* may convey to the cellular modem 165-*c* to effectively move to lower operating mode quickly.

At 1030, the cellular modem 165-*c* of the CPE may determine whether to request for additional BWPs from the network. If the cellular modem 165-*c* of the CPE determines that the WLAN AP 170-*c* of the CPE is requesting for additional BWPs over a number of occasions (e.g., a threshold number of attempts), the cellular modem 165-*c* may inform the network for the additional BWPs (e.g., additional uplink BWPs) at 1035. Otherwise, if the cellular modem 165-*c* of the CPE determines that the WLAN AP 170-*c* of the CPE is not requesting for additional BWPs over a number of occasions, the cellular modem 165-*c* may return to monitoring events (e.g., Wi-Fi events) at 1010.

FIG. 11 shows a block diagram 1100 of a device 1105 that supports techniques for data transfer using BWPs for wireless access in accordance with one or more aspects of the present disclosure. The device 1105 may be an example of aspects of a device (e.g., a 5G-CPE) as described herein. The device 1105 may include a receiver 1110, a transmitter 1115, and a communications manager 1120. The device 1105 may also include a processor (not shown). Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for uplink data transfer using BWPs for wireless access). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for uplink data transfer using BWPs for wireless access). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for uplink data transfer using BWPs for wireless access as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The device 1105 may be a CPE as described herein that may include both a WLAN AP and a cellular modem. The WLAN AP and the cellular modem may be physically located at the same position (e.g., physically located at the same physical location). For example, the WLAN AP and the cellular modem may be part of (e.g., housed) the CPE. Alternatively, the device 1105 may be a CPE that may include a WLAN AP and a cellular modem that are physically located at various positions, including being distributed such that portions of functions are implemented at different physical locations. For example, a WLAN AP of the CPE may be located at one physical location and perform respective functions and operations related to techniques for data transfer using BWPs for wireless access as described herein, while a cellular modem of the CPE may be located at another physical location and perform respective functions and operations related to techniques for data transfer using BWPs for wireless access as described herein.

The communications manager 1120 may support wireless communication at the device 1105 (e.g., a CPE) in accordance with examples as disclosed herein. For example, the communications manager 1120 may be configured as or otherwise support a means for receiving a first indication of a BWP configuration identifying an active BWP for the wireless communication. The communications manager 1120 may be configured as or otherwise support a means for sending a second indication to switch to the active BWP for the wireless communication based at least in part on the BWP configuration. The communications manager 1120 may be configured as or otherwise support a means for communicating with one or more STAs served by the device 1105.

In some examples, the communications manager 1120 may support wireless communication at the device 1105 (e.g., a CPE) in accordance with examples as disclosed herein. For example, the communications manager 1120 may be configured as or otherwise support a means for receiving, by a cellular modem of the device 1105, a first indication of a BWP configuration identifying an active BWP for the wireless communication. The communications manager 1120 may be configured as or otherwise support a means for sending, from the cellular modem of the device 1105 to a WLAN AP of the device 1105, a second indication to switch to the active BWP for the wireless communication using the WLAN AP based on the BWP configuration. The communications manager 1120 may be configured as or otherwise support a means for communicating with one or more STAs served by the device 1105 using the WLAN AP of the device 1105 and in accordance with the active BWP.

In some other examples, the communications manager 1120 may support wireless communication at the device 1105 (e.g., a cellular modem of a CPE) in accordance with examples as disclosed herein. For example, the communications manager 1120 may be configured as or otherwise support a means for receiving a first indication of a BWP configuration identifying an active BWP. The communications manager 1120 may be configured as or otherwise support a means for sending, to a WLAN AP, a second indication to switch to the active BWP based at least in part on the BWP configuration.

In other examples, the communications manager 1120 may support wireless communication at the device 1105 (e.g., a WLAN AP of a CPE) in accordance with examples as disclosed herein. For example, the communications manager 1120 may be configured as or otherwise support a means for receiving an indication to switch to an active BWP for the wireless communication. The communications manager 1120 may be configured as or otherwise support a means for communicating with one or more STAs served by the device 1105 using a WLAN AP associated with the device 1105 and in accordance with the active BWP.

Additionally or alternatively, the communications manager 1120 may support wireless communication at the device 1105 (e.g., a CPE) in accordance with examples as disclosed herein. For example, the communications manager 1120 may be configured as or otherwise support a means for sending a request for one or more additional BWPs based on one or more traffic flows associated with the wireless communication exceeding an active BWP for the wireless communication. The communications manager 1120 may be configured as or otherwise support a means for receiving an indication of a BWP configuration identifying the one or more additional BWPs. The communications manager 1120 may be configured as or otherwise support a means for communicating with one or more STAs served by the device 1105 in accordance with the one or more additional BWPs.

In some examples, the communications manager 1120 may support wireless communication at the device 1105 (e.g., a 5G-CPE) in accordance with examples as disclosed herein. For example, the communications manager 1120 may be configured as or otherwise support a means for sending, from a WLAN AP of the device 1105 to a cellular modem of the device 1105, a request for one or more additional BWPs based on one or more traffic flows associated with the wireless communication for one or more of the cellular modem of the device 1105 and the WLAN AP of the device 1105 exceeding an active BWP for the wireless communication. The communications manager 1120 may be configured as or otherwise support a means for receiving, at the WLAN AP of the device 1105, an indication of a BWP configuration identifying the one or more additional BWPs. The communications manager 1120 may be configured as or otherwise support a means for communicating with one or more STAs served by the device 1105 using the WLAN AP of the device 1105 and in accordance with the one or more additional BWPs.

In some other examples, the communications manager 1120 may support wireless communication at the device 1105 (e.g., a cellular modem of a CPE) in accordance with examples as disclosed herein. For example, the communications manager 1120 may be configured as or otherwise support a means for sending a request for one or more additional BWPs based on one or more traffic flows associated with the wireless communication exceeding an active BWP for the wireless communication. The communications manager 1120 may be configured as or otherwise support a means for communicating with one or more STAs served by the device 1105 in accordance with the one or more additional BWPs.

In other examples, the communications manager 1120 may support wireless communication at the device 1105 (e.g., a WLAN AP of a CPE) in accordance with examples as disclosed herein. For example, the communications manager 1120 may be configured as or otherwise support a means for receiving an indication of a BWP configuration identifying one or more additional BWPs. The communications manager 1120 may be configured as or otherwise support a means for communicating with one or more STAs served by the device 1105 in accordance with the one or more additional BWPs.

By including or configuring the communications manager 1120 in accordance with examples as described herein, the device 1105 (e.g., a processor controlling or otherwise coupled to the receiver 1110, the transmitter 1115, the communications manager 1120, or any combination thereof) may support techniques for reduced processing, reduced power consumption, more efficient utilization of communication resources. For example, the device 1105 may experience lesser wasted airtime on Wi-Fi interface. The device 1105 may also avoid last minute packet drops on a 5G modem of the device 1105 due to mismatch in bandwidth. The device 1105 may avoid costly uplink connection setup and latency on the 5G modem of the device 1105 due to transient congestion in a Wi-Fi network. The device 1105 may support better coordination between UE (e.g., Wi-Fi client) uplink requirements and the 5G modem of the device 1105 dynamically adapting its BWP with the network.

FIG. 12 shows a block diagram 1200 of a device 1205 that supports techniques for data transfer using BWPs for wireless access in accordance with one or more aspects of the present disclosure. The device 1205 may be an example of aspects of a device 1105 (e.g., a 5G-CPE) as described herein. The device 1205 may include a receiver 1210, a transmitter 1215, and a communications manager 1220. The device 1205 may also include a processor (not shown). Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for uplink data transfer using BWPs for wireless access). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for uplink data transfer using BWPs for wireless access). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for uplink data transfer using BWPs for wireless access as described herein. For example, the communications manager 1220 may include a configuration component 1225, a bandwidth component 1230, a channel component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at the device 1205 in accordance with examples as disclosed herein. The configuration component 1225 may be configured as or otherwise support a means for receiving a first indication of a BWP configuration identifying an active BWP for the wireless communication. The bandwidth component 1230 may be configured as or otherwise support a means for sending a second indication to switch to the active BWP for the wireless communication based on the BWP configuration. The channel component 1235 may be configured as or otherwise support a means for communicating with one or more STAs served by the device 1205 in accordance with the active BWP.

In some other examples, the configuration component 1225 may be configured as or otherwise support a means for receiving, by a cellular modem of the device 1205, a first indication of a BWP configuration identifying an active BWP for the wireless communication. The bandwidth component 1230 may be configured as or otherwise support a means for sending, from the cellular modem of the device 1205 to a WLAN AP of the device 1205, a second indication to switch to the active BWP for the wireless communication using the WLAN AP based on the BWP configuration. The channel component 1235 may be configured as or otherwise support a means for communicating with one or more STAs served by the device 1205 using the WLAN AP of the device 1205 and in accordance with the active BWP.

Additionally or alternatively, the communications manager 1220 may support wireless communication at the device 1205 in accordance with examples as disclosed herein. The bandwidth component 1230 may be configured as or otherwise support a means for sending a request for one or more additional BWPs based on one or more traffic flows associated with the wireless communication exceeding an active BWP for the wireless communication. The configuration component 1225 may be configured as or otherwise support a means for receiving an indication of a BWP configuration identifying the one or more additional BWPs. The channel component 1235 may be configured as or otherwise support a means for communicating with one or more STAs served by the device 1205 in accordance with the one or more additional BWPs.

In some other examples, the bandwidth component 1230 may be configured as or otherwise support a means for sending, from a WLAN AP of the device 1205 to a cellular modem of the device 1205, a request for one or more additional BWPs based on one or more traffic flows associated with the wireless communication for one or more of the cellular modem of the device 1205 and the WLAN AP of the device 1205 exceeding an active BWP for the wireless communication. The configuration component 1225 may be configured as or otherwise support a means for receiving, at the WLAN AP of the device 1205, an indication of a BWP configuration identifying the one or more additional BWPs. The channel component 1235 may be configured as or otherwise support a means for communicating with one or more STAs served by the device 1205 using the WLAN AP of the device 1205 and in accordance with the one or more additional BWPs.

FIG. 13 shows a block diagram 1300 of a communications manager 1320 that supports techniques for data transfer using BWPs for wireless access in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for uplink data transfer using BWPs for wireless access as described herein. For example, the communications manager 1320 may include a configuration component 1325, a bandwidth component 1330, a channel component 1335, an event component 1340, a traffic component 1345, a timer component 1350, a scheduler component 1355, or any combination thereof. Each of these components may communicate, directly or indirectly, with one another (e.g., via one or more buses).

The communications manager 1320 may support wireless communication at a device in accordance with examples as disclosed herein. The configuration component 1325 may be configured as or otherwise support a means for receiving a first indication of a BWP configuration identifying an active BWP for the wireless communication. In some examples, the configuration component 1325 may be configured as or otherwise support a means for receiving, by a cellular modem of the device, a first indication of a BWP configuration identifying an active BWP for the wireless communication. The bandwidth component 1330 may be configured as or otherwise support a means for sending a second indication to switch to the active BWP for the wireless communication based on the BWP configuration. In some examples, the bandwidth component 1330 may be configured as or otherwise support a means for sending, from the cellular modem of the device to a WLAN AP of the device, a second indication to switch to the active BWP for the wireless communication using the WLAN AP based on the BWP configuration. The channel component 1335 may be configured as or otherwise support a means for communicating with one or more STAs served by the device in accordance with the active BWP. In some examples, the channel component 1335 may be configured as or otherwise support a means for communicating with one or more STAs served by the device using the WLAN AP of the device and in accordance with the active BWP.

The event component 1340 may be configured as or otherwise support a means for monitoring one or more WLAN events associated with the device. The channel component 1335 may be configured as or otherwise support a means for communicating with the one or more STAs served by the device based on the monitoring of the one or more WLAN events associated with the WLAN AP of the device. In some examples, the event component 1340 may be configured as or otherwise support a means for monitoring, by the cellular modem of the device, one or more WLAN events associated with the WLAN AP of the device. In some examples, the channel component 1335 may be configured as or otherwise support a means for communicating with the one or more STAs served by the device using the WLAN AP of the device based on the monitoring of the one or more WLAN events associated with the WLAN AP of the device.

The traffic component 1345 may be configured as or otherwise support a means for receiving a third indication of a congestion at the device based on one or more traffic flows associated with the wireless communication over one or more occasions. In some examples, the traffic component 1345 may be configured as or otherwise support a means for receiving, by the cellular modem of the device from the WLAN AP of the device, a third indication of a congestion at the WLAN AP of the device based on one or more traffic flows associated with the wireless communication for one or more of the cellular modem of the device or the WLAN AP of the device over one or more occasions. The timer component 1350 may be configured as or otherwise support a means for resetting an inactivity timer based on the third indication of the congestion at the device over one or more subsequent occasions. In some examples, the timer component 1350 may be configured as or otherwise support a means for resetting an inactivity timer based on the third indication of the congestion at the WLAN AP of the device over one or more subsequent occasions.

The bandwidth component 1330 may be configured as or otherwise support a means for receiving a request for one or more additional BWPs based on one or more traffic flows associated with the wireless communication exceeding the active BWP for the wireless communication. In some examples, the bandwidth component 1330 may be configured as or otherwise support a means for receiving, by the cellular modem of the device from the WLAN AP of the device, a request for one or more additional BWPs based on one or more traffic flows associated with the wireless communication for one or more of the cellular modem of the device or the WLAN AP of the device exceeding the active BWP for the wireless communication. The channel component 1335 may be configured as or otherwise support a means for communicating with the one or more STAs served by the device based on the request for the one or more additional BWPs. In some examples, the channel component 1335 may be configured as or otherwise support a means for communicating with the one or more STAs served by the device using the WLAN AP of the device based on the request for the one or more additional BWPs.

The bandwidth component 1330 may be configured as or otherwise support a means for allocating the one or more additional BWPs for the one or more traffic flows associated with the wireless communication based on the request for the one or more additional BWPs. In some examples, the bandwidth component 1330 may be configured as or otherwise support a means for allocating the one or more additional BWPs for the one or more traffic flows associated with the wireless communication for one or more of the cellular modem of the device or the WLAN AP of the device based on the request for the one or more additional BWPs. The active BWP including the one or more additional BWPs for the wireless communication. The channel component 1335 may be configured as or otherwise support a means for communicating with the one or more STAs served by the device based on the allocating of the one or more additional BWPs. In some examples, the channel component 1335 may be configured as or otherwise support a means for communicating with the one or more STAs served by the device using the WLAN AP of the device based on the allocating of the one or more additional BWPs.

The bandwidth component 1330 may be configured as or otherwise support a means for sending a third indication to switch to a default BWP for the wireless communication based on an inactivity timer expiring. In some examples, the bandwidth component 1330 may be configured as or otherwise support a means for sending, by the cellular modem of the device to the WLAN AP of the device, a third indication to switch to a default BWP for the wireless communication based on an inactivity timer expiring. The channel component 1335 may be configured as or otherwise support a means for communicating with the one or more STAs served by the device based on the default BWP. In some examples, the channel component 1335 may be configured as or otherwise support a means for communicating with the one or more STAs served by the device using the WLAN AP of the device based on the default BWP.

The timer component 1350 may be configured as or otherwise support a means for resetting an inactivity timer based on one or more of receiving a third indication to reset the inactivity timer, or an absence of receiving an additional request for the one or more additional BWPs during one or more occasions based on the one or more traffic flows associated with the wireless communication exceeding the active BWP for the wireless communication. In some examples, the timer component 1350 may be configured as or otherwise support a means for resetting an inactivity timer based on one or more of receiving from the WLAN AP of the device a third indication to reset the inactivity timer, or an absence of receiving an additional request for the one or more additional BWPs during one or more occasions based on the one or more traffic flows associated with the wireless communication for one or more of the cellular modem of the device or the WLAN AP of the device exceeding the active BWP for the wireless communication.

Additionally or alternatively, the communications manager 1320 may support wireless communication at a device in accordance with examples as disclosed herein. The bandwidth component 1330 may be configured as or otherwise support a means for sending a request for one or more additional BWPs based on one or more traffic flows associated with the wireless communication exceeding an active BWP for the wireless communication. In some examples, the bandwidth component 1330 may be configured as or otherwise support a means for sending, from a WLAN AP of the device to a cellular modem of the device, a request for one or more additional BWPs based on one or more traffic flows associated with the wireless communication for one or more of the cellular modem of the device and the WLAN AP of the device exceeding an active BWP for the wireless communication. The configuration component 1325 may be configured as or otherwise support a means for receiving an indication of a BWP configuration identifying the one or more additional BWPs. In some examples, the configuration component 1325 may be configured as or otherwise support a means for receiving, at the WLAN AP of the device, an indication of a BWP configuration identifying the one or more additional BWPs. The channel component 1335 may be configured as or otherwise support a means for communicating with one or more STAs served by the device in accordance with the one or more additional BWPs. In some examples, the channel component 1335 may be configured as or otherwise support a means for communicating with one or more STAs served by the device using the WLAN AP of the device and in accordance with the one or more additional BWPs.

The traffic component 1345 may be configured as or otherwise support a means for monitoring the one or more traffic flows associated with the wireless communication. In some examples, the traffic component 1345 may be configured as or otherwise support a means for monitoring, by the WLAN AP of the device, the one or more traffic flows associated with the wireless communication for one or more of the cellular modem of the device or the WLAN AP of the device. The channel component 1335 may be configured as or otherwise support a means for communicating with the one or more STAs served by the device based on the monitoring of the one or more traffic flows associated with the wireless communication. In some examples, the channel component 1335 may be configured as or otherwise support a means for communicating with the one or more STAs served by the device using the WLAN AP of the device based on the monitoring of the one or more traffic flows associated with the wireless communication for one or more of the cellular modem of the device or the WLAN AP of the device.

The traffic component 1345 may be configured as or otherwise support a means for receiving, from a PDN, the one or more traffic flows associated with the wireless communication. In some examples, the traffic component 1345 may be configured as or otherwise support a means for receiving, from a PDN, the one or more traffic flows associated with the wireless communication for one or more of the cellular modem of the device or the WLAN AP of the device. The traffic component 1345 may be configured as or otherwise support a means for grouping the one or more traffic flows associated with the wireless communication. In some examples, the traffic component 1345 may be configured as or otherwise support a means for grouping the one or more traffic flows associated with the wireless communication for the cellular modem of the device.

The scheduler component 1355 may be configured as or otherwise support a means for scheduling the one or more traffic flows associated with the wireless communication based on one or more of the active BWP for the wireless communication. In some examples, the scheduler component 1355 may be configured as or otherwise support a means for scheduling the one or more traffic flows associated with the wireless communication for the cellular modem of the device based on one or more of the active BWP for the wireless communication. The channel component 1335 may be configured as or otherwise support a means for communicating with the one or more STAs served by the device based on the scheduling of the one or more traffic flows associated with the wireless communication. In some examples, the channel component 1335 may be configured as or otherwise support a means for communicating with the one or more STAs served by the device using the WLAN AP of the device based on the scheduling of the one or more traffic flows associated with the wireless communication for the cellular modem of the device.

The traffic component 1345 may be configured as or otherwise support a means for sending a second indication of a congestion at the device based on determining that a channel associated with the device is unavailable for the one or more traffic flows associated with the wireless communication over one or more occasions. In some examples, the traffic component 1345 may be configured as or otherwise support a means for sending, to the cellular modem of the device from the WLAN AP of the device, a second indication of a congestion at the WLAN AP of the device based on determining that a channel associated with the WLAN AP of the device is unavailable for the one or more traffic flows associated with the wireless communication for the cellular modem of the device over one or more occasions. The traffic component 1345 may be configured as or otherwise support a means for sending the request for the one or more additional BWPs based on a buffer associated with the device satisfying a threshold over one or more occasions. In some examples, sending the request for the one or more additional BWPs may be based on a buffer associated with the WLAN AP of the device satisfying a threshold over one or more occasions.

The bandwidth component 1330 may be configured as or otherwise support a means for receiving a second indication to switch to a default BWP for the wireless communication or a RRC configuration to switch to the default BWP for the wireless communication. In some examples, the bandwidth component 1330 may be configured as or otherwise support a means for receiving, from the cellular modem of the device at the WLAN AP of the device, a second indication to switch to a default BWP for the wireless communication or a RRC configuration to switch to the default BWP for the wireless communication. The timer component 1350 may be configured as or otherwise support a means for determining an expiration of an inactivity timer associated with the device. In some examples, the timer component 1350 may be configured as or otherwise support a means for determining an expiration of an inactivity timer associated with the cellular modem of the device. In some examples, the bandwidth component 1330 may be configured as or otherwise support a means for switching to the default BWP for the wireless communication based on the expiration of the inactivity timer. The channel component 1335 may be configured as or otherwise support a means for communicating with the one or more STAs served by the device based on the default BWP. In some other examples, the channel component 1335 may be configured as or otherwise support a means for communicating with the one or more STAs served by the device using the WLAN AP of the device based on the default BWP.

FIG. 14 shows a diagram of a system 1400 including a device 1405 that supports techniques for data transfer using BWPs for wireless access in accordance with one or more aspects of the present disclosure. The device 1405 may be an example of or include the components of a device 1105, a device 1205, a base station 105 (e.g., a 5G-CPE) as described herein. The device 1405 may communicate wirelessly with one or more base STAs 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115 (also referred to as STAs). In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include a random-access memory (RAM) and a read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic input-output system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for uplink data transfer using BWPs for wireless access). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The device 1405 may be a CPE as described herein that may include both a WLAN AP and a cellular modem. The WLAN AP and the cellular modem may be physically located at the same position (e.g., physically located at the same physical location). For example, the WLAN AP and the cellular modem may be part of (e.g., housed) the CPE. Alternatively, the device 1405 may be a CPE that may include a WLAN AP and a cellular modem that are physically located at various positions, including being distributed such that portions of functions are implemented at different physical locations. For example, a WLAN AP of the CPE may be located at one physical location and perform respective functions and operations related to techniques for data transfer using BWPs for wireless access as described herein, while a cellular modem of the CPE may be located at another physical location and perform respective functions and operations related to techniques for data transfer using BWPs for wireless access as described herein.

The communications manager 1420 may support wireless communication at the device 1405 (e.g., a CPE) in accordance with examples as disclosed herein. For example, the communications manager 1420 may be configured as or otherwise support a means for receiving a first indication of a BWP configuration identifying an active BWP for the wireless communication. The communications manager 1420 may be configured as or otherwise support a means for sending a second indication to switch to the active BWP for the wireless communication based at least in part on the BWP configuration. The communications manager 1420 may be configured as or otherwise support a means for communicating with one or more STAs served by the device 1405.

In some examples, the communications manager 1420 may support wireless communication at the device 1405 in accordance with examples as disclosed herein. For example, the communications manager 1420 may be configured as or otherwise support a means for receiving, by a cellular modem of the device 1405, a first indication of a BWP configuration identifying an active BWP for the wireless communication. The communications manager 1420 may be configured as or otherwise support a means for sending, from the cellular modem of the device 1405 to a WLAN AP of the device 1405, a second indication to switch to the active BWP for the wireless communication using the WLAN AP based on the BWP configuration. The communications manager 1420 may be configured as or otherwise support a means for communicating with one or more STAs served by the device 1405 using the WLAN AP of the device 1405 and in accordance with the active BWP.

In some other examples, the communications manager 1420 may support wireless communication at the device 1405 (e.g., a cellular modem of a CPE) in accordance with examples as disclosed herein. For example, the communications manager 1420 may be configured as or otherwise support a means for receiving a first indication of a BWP configuration identifying an active BWP. The communications manager 1420 may be configured as or otherwise support a means for sending, to a WLAN AP, a second indication to switch to the active BWP based at least in part on the BWP configuration.

In other examples, the communications manager 1420 may support wireless communication at the device 1405 (e.g., a WLAN AP of a CPE) in accordance with examples as disclosed herein. For example, the communications manager 1420 may be configured as or otherwise support a means for receiving an indication to switch to an active BWP for the wireless communication. The communications manager 1420 may be configured as or otherwise support a means for communicating with one or more STAs served by the device 1405 using a WLAN AP associated with the device 1105 and in accordance with the active BWP.

Additionally or alternatively, the communications manager 1420 may support wireless communication at the device 1405 (e.g., a CPE) in accordance with examples as disclosed herein. For example, the communications manager 1420 may be configured as or otherwise support a means for sending a request for one or more additional BWPs based on one or more traffic flows associated with the wireless communication exceeding an active BWP for the wireless communication. The communications manager 1420 may be configured as or otherwise support a means for receiving an indication of a BWP configuration identifying the one or more additional BWPs. The communications manager 1420 may be configured as or otherwise support a means for communicating with one or more STAs served by the device 1405 in accordance with the one or more additional BWPs.

In some examples, the communications manager 1420 may support wireless communication at the device 1405 in accordance with examples as disclosed herein. For example, the communications manager 1420 may be configured as or otherwise support a means for sending, from a WLAN AP of the device 1405 to a cellular modem of the device 1405, a request for one or more additional BWPs based on one or more traffic flows associated with the wireless communication for one or more of the cellular modem of the device 1405 and the WLAN AP of the device 1405 exceeding an active BWP for the wireless communication. The communications manager 1420 may be configured as or otherwise support a means for receiving, at the WLAN AP of the device 1405, an indication of a BWP configuration identifying the one or more additional BWPs. The communications manager 1420 may be configured as or otherwise support a means for communicating with one or more STAs served by the device 1405 using the WLAN AP of the device 1405 and in accordance with the one or more additional BWPs.

In some other examples, the communications manager 1420 may support wireless communication at the device 1405 (e.g., a cellular modem of a CPE) in accordance with examples as disclosed herein. For example, the communications manager 1420 may be configured as or otherwise support a means for sending a request for one or more additional BWPs based on one or more traffic flows associated with the wireless communication exceeding an active BWP for the wireless communication. The communications manager 1420 may be configured as or otherwise support a means for communicating with one or more STAs served by the device 1405 in accordance with the one or more additional BWPs.

In other examples, the communications manager 1420 may support wireless communication at the device 1405 (e.g., a WLAN AP of a CPE) in accordance with examples as disclosed herein. For example, the communications manager 1420 may be configured as or otherwise support a means for receiving an indication of a BWP configuration identifying one or more additional BWPs. The communications manager 1420 may be configured as or otherwise support a means for communicating with one or more STAs served by the device 1405 in accordance with the one or more additional BWPs.

By including or configuring the communications manager 1420 in accordance with examples as described herein, the device 1405 may support techniques for communication reliability, reduced latency, user experience related to reduced processing, efficient utilization of communication resources, and coordination between devices.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described herein with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for uplink data transfer using BWPs for wireless access as described herein, or the processor 1440 and the memory 1430 may be otherwise configured to perform or support such operations.

Figure 15:
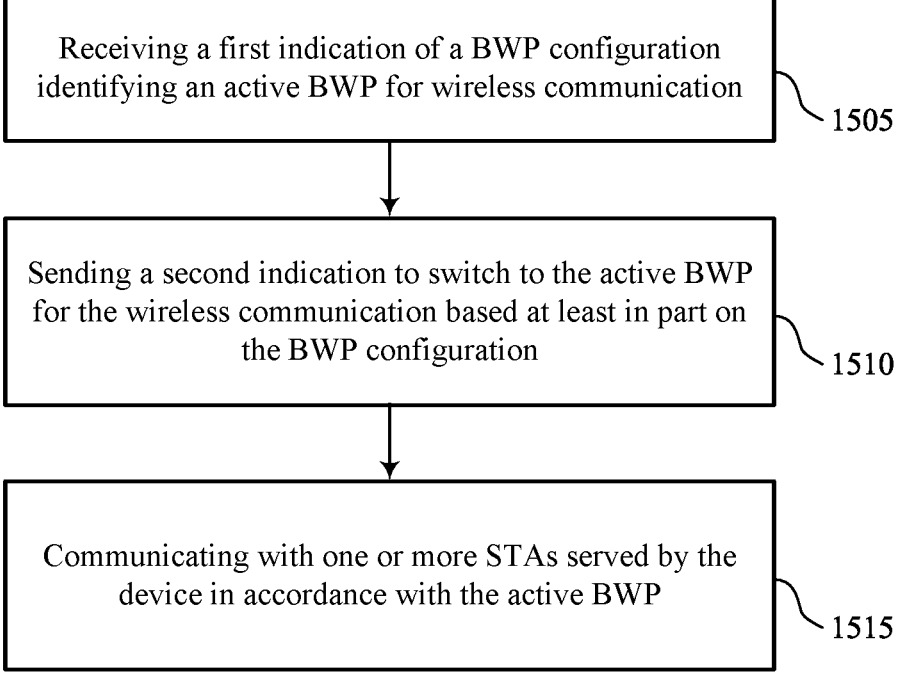

FIG. 15 shows a flowchart illustrating a method 1500 that supports techniques for data transfer using BWPs for wireless access in accordance with one or more aspects of the present disclosure. The operations of the method 1500 may be implemented by a device (e.g., a 5G-CPE) or its components as described herein. For example, the operations of the method 1500 may be performed by a base station 105 as described herein with reference to FIGS. 1 through 14. In some examples, a base station may execute a set of instructions to control the functional elements of the base station to perform the described functions. Additionally or alternatively, the base station may perform aspects of the described functions using special-purpose hardware.

At 1505, the method may include receiving a first indication of a BWP configuration identifying an active BWP for wireless communication. The operations of 1505 may be performed in accordance with examples as disclosed herein. In some examples, aspects of the operations of 1505 may be performed by a configuration component 1325 as described herein with reference to FIG. 13.

At 1510, the method may include sending a second indication to switch to the active BWP for the wireless communication based at least in part on the BWP configuration. The operations of 1510 may be performed in accordance with examples as disclosed herein. In some examples, aspects of the operations of 1510 may be performed by a bandwidth component 1330 as described herein with reference to FIG. 13.

At 1515, the method may include communicating with one or more STAs served by the device in accordance with the active BWP. The operations of 1515 may be performed in accordance with examples as disclosed herein. In some examples, aspects of the operations of 1515 may be performed by a channel component 1335 as described herein with reference to FIG. 13.

Figure 16:
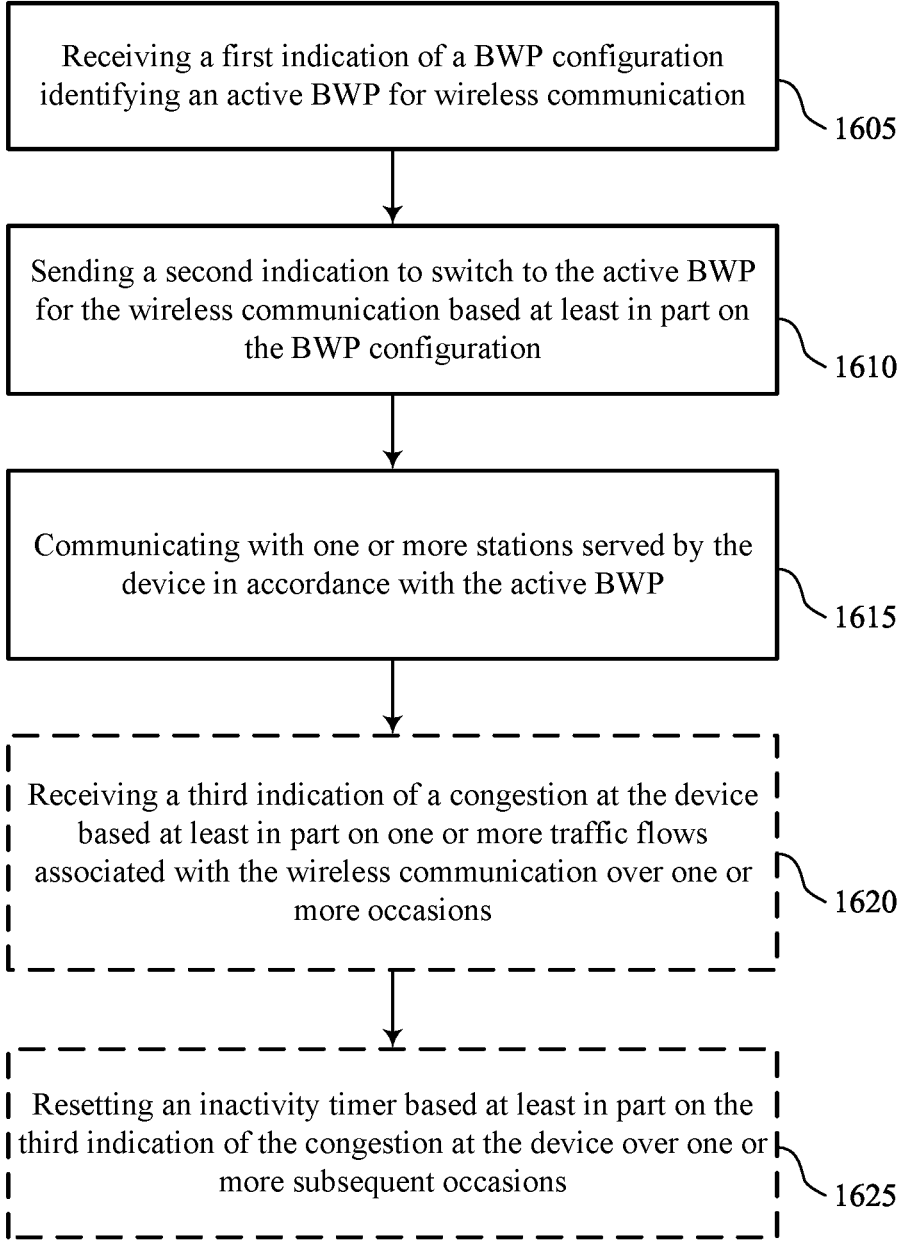

FIG. 16 shows a flowchart illustrating a method 1600 that supports techniques for data transfer using BWPs for wireless access in accordance with one or more aspects of the present disclosure. The operations of the method 1600 may be implemented by a device (e.g., a 5G-CPE) or its components as described herein. For example, the operations of the method 1600 may be performed by a base station 105 as described herein with reference to FIGS. 1 through 14. In some examples, a base station may execute a set of instructions to control the functional elements of the base station to perform the described functions. Additionally or alternatively, the base station may perform aspects of the described functions using special-purpose hardware.

At 1605, the method may include receiving a first indication of a BWP configuration identifying an active BWP for wireless communication. The operations of 1605 may be performed in accordance with examples as disclosed herein. In some examples, aspects of the operations of 1605 may be performed by a configuration component 1325 as described herein with reference to FIG. 13.

At 1610, the method may include sending a second indication to switch to the active BWP for the wireless communication based at least in part on the BWP configuration. The operations of 1610 may be performed in accordance with examples as disclosed herein. In some examples, aspects of the operations of 1610 may be performed by a bandwidth component 1330 as described herein with reference to FIG. 13.

At 1615, the method may include communicating with one or more STAs served by the device in accordance with the active BWP. The operations of 1615 may be performed in accordance with examples as disclosed herein. In some examples, aspects of the operations of 1615 may be performed by a channel component 1335 as described herein with reference to FIG. 13.

At 1620, the method may include receiving a third indication of a congestion at the device based at least in part on one or more traffic flows associated with the wireless communication over one or more occasions. The operations of 1620 may be performed in accordance with examples as disclosed herein. In some examples, aspects of the operations of 1620 may be performed by a traffic component 1345 as described herein with reference to FIG. 13.

At 1625, the method may include resetting an inactivity timer based at least in part on the third indication of the congestion at the device over one or more subsequent occasions. The operations of 1625 may be performed in accordance with examples as disclosed herein. In some examples, aspects of the operations of 1625 may be performed by a timer component 1350 as described herein with reference to FIG. 13.

FIG. 17 shows a flowchart illustrating a method 1700 that supports techniques for data transfer using BWPs for wireless access in accordance with one or more aspects of the present disclosure. The operations of the method 1700 may be implemented by a device (e.g., a 5G-CPE) or its components as described herein. For example, the operations of the method 1700 may be performed by a base station 105 as described herein with reference to FIGS. 1 through 14. In some examples, a base station may execute a set of instructions to control the functional elements of the base station to perform the described functions. Additionally or alternatively, the base station may perform aspects of the described functions using special-purpose hardware.

At 1705, the method may include receiving a first indication of a BWP configuration identifying an active BWP for the wireless communication. The operations of 1705 may be performed in accordance with examples as disclosed herein. In some examples, aspects of the operations of 1705 may be performed by a configuration component 1325 as described herein with reference to FIG. 13.

At 1710, the method may include sending a second indication to switch to the active BWP for the wireless communication based at least in part on the BWP configuration. The operations of 1710 may be performed in accordance with examples as disclosed herein. In some examples, aspects of the operations of 1710 may be performed by a bandwidth component 1330 as described herein with reference to FIG. 13.

At 1715, the method may include receiving a request for one or more additional BWPs based at least in part on one or more traffic flows associated with the wireless communication exceeding the active BWP for the wireless communication. The operations of 1715 may be performed in accordance with examples as disclosed herein. In some examples, aspects of the operations of 1715 may be performed by a bandwidth component 1330 as described herein with reference to FIG. 13.

At 1720, the method may include communicating with the one or more STAs served by the device based at least in part on the request for the one or more additional BWPs. The operations of 1720 may be performed in accordance with examples as disclosed herein. In some examples, aspects of the operations of 1720 may be performed by a channel component 1335 as described herein with reference to FIG. 13.

FIG. 18 shows a flowchart illustrating a method 1800 that supports techniques for data transfer using BWPs for wireless access in accordance with one or more aspects of the present disclosure. The operations of the method 1800 may be implemented by a base station or its components as described herein. For example, the operations of the method 1800 may be performed by a base station 105 as described herein with reference to FIGS. 1 through 14. In some examples, a base station may execute a set of instructions to control the functional elements of the base station to perform the described functions. Additionally or alternatively, the base station may perform aspects of the described functions using special-purpose hardware.

At 1805, the method may include sending a request for one or more additional BWPs based at least in part on one or more traffic flows associated with the wireless communication exceeding an active BWP for the wireless communication. The operations of 1805 may be performed in accordance with examples as disclosed herein. In some examples, aspects of the operations of 1805 may be performed by a bandwidth component 1330 as described herein with reference to FIG. 13.

At 1810, the method may include receiving an indication of a BWP configuration identifying the one or more additional BWPs. The operations of 1810 may be performed in accordance with examples as disclosed herein. In some examples, aspects of the operations of 1810 may be performed by a configuration component 1325 as described herein with reference to FIG. 13.

At 1815, the method may include communicating with one or more STAs served by the device in accordance with the one or more additional BWPs. The operations of 1815 may be performed in accordance with examples as disclosed herein. In some examples, aspects of the operations of 1815 may be performed by a channel component 1335 as described herein with reference to FIG. 13.

The following provides an overview of aspects of the present disclosure:

Aspect 1: A method for wireless communication at a device, comprising: receiving a first indication of a BWP configuration identifying an active BWP for the wireless communication; sending a second indication to switch to the active BWP for the wireless communication based at least in part on the BWP configuration; and communicating with one or more STAs served by the device in accordance with the active BWP.

Aspect 2: The method of aspect 1, further comprising: monitoring one or more wireless local area network events associated with the device, wherein communicating with the one or more STAs served by the device is based at least in part on the monitoring of the one or more wireless local area network events associated with the device.

Aspect 3: The method of any of aspects 1 through 2, further comprising: receiving a third indication of a congestion at the device based at least in part on one or more traffic flows associated with the wireless communication over one or more occasions; and resetting an inactivity timer based at least in part on the third indication of the congestion at the device over one or more subsequent occasions.

Aspect 4: The method of any of aspects 1 through 3, further comprising: receiving a request for one or more additional BWPs based at least in part on one or more traffic flows associated with the wireless communication exceeding the active BWP for the wireless communication, wherein communicating with the one or more STAs served by the device is based at least in part on the request for the one or more additional BWPs.

Aspect 5: The method of aspect 4, further comprising: allocating the one or more additional BWPs for the one or more traffic flows associated with the wireless communication based at least in part on the request for the one or more additional BWPs, the active BWP including the one or more additional BWPs for the wireless communication, wherein communicating with the one or more STAs served by the device is based at least in part on the allocating of the one or more additional BWPs.

Aspect 6: The method of any of aspects 4 through 5, further comprising: sending a third indication to switch to a default BWP for the wireless communication based at least in part on an inactivity timer expiring, wherein communicating with the one or more STAs served by the device is based at least in part on the default BWP.

Aspect 7: The method of any of aspects 4 through 6, further comprising: resetting an inactivity timer based at least in part on an absence of receiving an additional request for the one or more additional BWPs during one or more occasions based at least in part on the one or more traffic flows associated with the wireless communication exceeding the active BWP for the wireless communication.

Aspect 8: A method for wireless communication at a device, comprising: sending a request for one or more additional BWPs based at least in part on one or more traffic flows associated with the wireless communication exceeding an active BWP for the wireless communication; receiving an indication of a BWP configuration identifying the one or more additional BWPs; and communicating with one or more STAs served by the device in accordance with the one or more additional BWPs.

Aspect 9: The method of aspect 8, further comprising: monitoring the one or more traffic flows associated with the wireless communication, wherein communicating with the one or more STAs served by the device is based at least in part on the monitoring of the one or more traffic flows associated with the wireless communication.

Aspect 10: The method of aspect 9, further comprising: receiving, from a PDN, the one or more traffic flows associated with the wireless communication; and grouping the one or more traffic flows associated with the wireless communication.

Aspect 11: The method of aspect 10, further comprising: scheduling the one or more traffic flows associated with the wireless communication based at least in part on one or more of the active BWP for the wireless communication, wherein communicating with the one or more STAs served by the device is based at least in part on the scheduling of the one or more traffic flows associated with the wireless communication.

Aspect 12: The method of any of aspects 8 through 11, further comprising: sending a second indication of a congestion at the device based at least in part on determining that a channel associated with the device is unavailable for the one or more traffic flows associated with the wireless communication over one or more occasions.

Aspect 13: An apparatus for wireless communication at a device, comprising a processor; a memory coupled with the processor, with instructions stored in the memory, the instructions being executable by the processor to cause the apparatus to perform a method of any of aspects 1 through 7.

Aspect 14: An apparatus for wireless communication at a device, comprising at least one means for performing a method of any of aspects 1 through 7.

Aspect 15: A non-transitory computer-readable medium storing code for wireless communication at a device, the code comprising instructions executable by a processor to perform a method of any of aspects 1 through 7.

Aspect 16: An apparatus for wireless communication at a device, comprising a processor; a memory coupled with the processor, with instructions stored in the memory, the instructions being executable by the processor to cause the apparatus to perform a method of any of aspects 8 through 11.

Aspect 17: An apparatus for wireless communication at a device, comprising at least one means for performing a method of any of aspects 8 through 11.

Aspect 18: A non-transitory computer-readable medium storing code for wireless communication at a device, the code comprising instructions executable by a processor to perform a method of any of aspects 8 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as any combination of computing devices (e.g., any combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:
at least one processor; and
at least one memory coupled with the at least one processor, with instructions stored in the at least one memory, the instructions being executable by the at least one processor, individually or in any combination, to cause the apparatus to:
receive a first indication of a bandwidth part configuration identifying an active bandwidth part for the wireless communication;
send a second indication to switch to the active bandwidth part for the wireless communication based at least in part on the bandwidth part configuration;
communicate with one or more stations served by the apparatus in accordance with the active bandwidth part;
receive a third indication of a congestion at the apparatus based at least in part on one or more traffic flows associated with the wireless communication over one or more occasions; and reset an inactivity timer based at least in part on the third indication of the congestion at the apparatus over one or more subsequent occasions.

2. The apparatus of claim 1, wherein the instructions are further executable by the at least one processor to cause the apparatus to:

monitor one or more wireless local area network events associated with the apparatus, wherein to communicate with the one or more stations served by the apparatus is based at least in part on the monitoring of the one or more wireless local area network events associated with the apparatus.

3. The apparatus of claim 1, wherein the instructions are further executable by the at least one processor to cause the apparatus to:

receive a request for one or more additional bandwidth parts based at least in part on the one or more traffic flows associated with the wireless communication exceeding the active bandwidth part for the wireless communication, wherein to communicate with the one or more stations served by the apparatus is based at least in part on the request for the one or more additional bandwidth parts.

4. The apparatus of claim 3, wherein the instructions are further executable by the at least one processor to cause the apparatus to:

allocate the one or more additional bandwidth parts for the one or more traffic flows associated with the wireless communication based at least in part on the request for the one or more additional bandwidth parts, the active bandwidth part including the one or more additional bandwidth parts for the wireless communication, wherein to communicate with the one or more stations served by the apparatus is based at least in part on the allocating of the one or more additional bandwidth parts.

5. The apparatus of claim 3, wherein the instructions are further executable by the at least one processor to cause the apparatus to:

send a fourth indication to switch to a default bandwidth part for the wireless communication based at least in part on the inactivity timer expiring, wherein to communicate with the one or more stations served by the apparatus is based at least in part on the default bandwidth part.

6. The apparatus of claim 3, wherein the instructions are further executable by the at least one processor to cause the apparatus to:

reset the inactivity timer based at least in part on one or more of receiving a fourth indication to reset the inactivity timer, or an absence of receiving an additional request for the one or more additional bandwidth parts during the one or more occasions based at least in part on the one or more traffic flows associated with the wireless communication exceeding the active bandwidth part for the wireless communication.

7. The apparatus of claim 1, further comprising:

an antenna or an antenna array, or both.

8. The apparatus of claim 1, wherein the apparatus comprises one or more of a cellular modem or a wireless local area network access point.

9. An apparatus for wireless communication, comprising:

at least one processor; and at least one memory coupled with the at least one processor, with instructions stored in the at least one memory, the instructions being executable by the at least one processor, individually or in any combination, to cause the apparatus to:

send a first indication of a congestion at the apparatus based at least in part on determining that a channel associated with the apparatus is unavailable for one or more traffic flows associated with the wireless communication over one or more occasions;

send a request for one or more additional bandwidth parts based at least in part on the one or more traffic flows associated with the wireless communication exceeding an active bandwidth part for the wireless communication;

receive a second indication of a bandwidth part configuration identifying the one or more additional bandwidth parts; and communicate with one or more stations served by the apparatus in accordance with the one or more additional bandwidth parts.

10. The apparatus of claim 9, wherein the instructions are further executable by the at least one processor to cause the apparatus to:

monitor the one or more traffic flows associated with the wireless communication, wherein to communicate with the one or more stations served by the apparatus is based at least in part on the monitoring of the one or more traffic flows associated with the wireless communication.

11. The apparatus of claim 10, wherein the instructions are further executable by the at least one processor to cause the apparatus to:

receive, from a data network, the one or more traffic flows associated with the wireless communication; and group the one or more traffic flows associated with the wireless communication.

12. The apparatus of claim 10, wherein the instructions are further executable by the at least one processor to cause the apparatus to:

schedule the one or more traffic flows associated with the wireless communication based at least in part on one or more of the active bandwidth part for the wireless communication, wherein to communicate with the one or more stations served by the apparatus is based at least in part on the scheduling of the one or more traffic flows associated with the wireless communication.

13. The apparatus of claim 9, wherein the instructions are further executable by the at least one processor to cause the apparatus to:

send the request for the one or more additional bandwidth parts based at least in part on a buffer associated with the apparatus satisfying a threshold over the one or more occasions.

14. The apparatus of claim 9, wherein the instructions are further executable by the at least one processor to cause the apparatus to:

receive a third indication to switch to a default bandwidth part for the wireless communication or a radio resource control configuration to switch to the default bandwidth part for the wireless communication;

determine an expiration of an inactivity timer associated with the apparatus; and switch to the default bandwidth part for the wireless communication based at least in part on the expiration of the inactivity timer, wherein the at least one processor and the at least one memory are configured to communicate with the one or more stations served by the apparatus based at least in part on the default bandwidth part.

15. The apparatus of claim 9, further comprising:

an antenna or an antenna array, or both.

16. The apparatus of claim 9, wherein the apparatus comprises one or more of a cellular modem or a wireless local area network access point.

17. A method for wireless communication at a device, comprising:

receiving a first indication of a bandwidth part configuration identifying an active bandwidth part for the wireless communication;

sending a second indication to switch to the active bandwidth part for the wireless communication based at least in part on the bandwidth part configuration;

communicating with one or more stations served by the device in accordance with the active bandwidth part;

receiving a third indication of a congestion at the device based at least in part on one or more traffic flows associated with the wireless communication over one or more occasions; and resetting an inactivity timer based at least in part on the third indication of the congestion at the device over one or more subsequent occasions.

18. The method of claim 17, further comprising:

monitoring one or more wireless local area network events associated with the device, wherein communicating with the one or more stations served by the device is based at least in part on the monitoring of the one or more wireless local area network events associated with the device.

19. The method of claim 17, further comprising:

receiving a request for one or more additional bandwidth parts based at least in part on the one or more traffic flows associated with the wireless communication exceeding the active bandwidth part for the wireless communication, wherein communicating with the one or more stations served by the device is based at least in part on the request for the one or more additional bandwidth parts.

20. The method of claim 19, further comprising:

allocating the one or more additional bandwidth parts for the one or more traffic flows associated with the wireless communication based at least in part on the request for the one or more additional bandwidth parts, the active bandwidth part including the one or more additional bandwidth parts for the wireless communication, wherein communicating with the one or more stations served by the device is based at least in part on the allocating of the one or more additional bandwidth parts.

21. The method of claim 19, further comprising:

sending a fourth indication to switch to a default bandwidth part for the wireless communication based at least in part on the inactivity timer expiring, wherein communicating with the one or more stations served by the device is based at least in part on the default bandwidth part.

22. The method of claim 19, further comprising:

resetting the inactivity timer based at least in part on an absence of receiving an additional request for the one or more additional bandwidth parts during the one or more occasions based at least in part on the one or more traffic flows associated with the wireless communication exceeding the active bandwidth part for the wireless communication.

23. A method for wireless communication at a device, comprising:

sending a first indication of a congestion at the device based at least in part on determining that a channel associated with the device is unavailable for one or more traffic flows associated with the wireless communication over one or more occasions;

sending a request for one or more additional bandwidth parts based at least in part on the one or more traffic flows associated with the wireless communication exceeding an active bandwidth part for the wireless communication;

receiving a second indication of a bandwidth part configuration identifying the one or more additional bandwidth parts; and communicating with one or more stations served by the device in accordance with the one or more additional bandwidth parts.

24. The method of claim 23, further comprising:

monitoring the one or more traffic flows associated with the wireless communication, wherein communicating with the one or more stations served by the device is based at least in part on the monitoring of the one or more traffic flows associated with the wireless communication.

25. The method of claim 24, further comprising:

receiving, from a data network, the one or more traffic flows associated with the wireless communication; and grouping the one or more traffic flows associated with the wireless communication.

26. The method of claim 25, further comprising:

scheduling the one or more traffic flows associated with the wireless communication based at least in part on one or more of the active bandwidth part for the wireless communication, wherein communicating with the one or more stations served by the device is based at least in part on the scheduling of the one or more traffic flows associated with the wireless communication.

* * * * *